(12) United States Patent
Ash et al.

(10) Patent No.: US 6,918,186 B2
(45) Date of Patent: *Jul. 19, 2005

(54) COMPACT NAVIGATION SYSTEM AND METHOD

(75) Inventors: Michael E. Ash, Lexington, MA (US); Paul A. DeBitetto, Stow, MA (US); Anthony S. Kourepenis, Acton, MA (US); Tom P. Thorvaldsen, Hingham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/768,309

(22) Filed: Jan. 30, 2004

(65) Prior Publication Data

US 2005/0022402 A1 Feb. 3, 2005

Related U.S. Application Data

(63) Continuation-in-part of application No. 10/632,717, filed on Aug. 1, 2003.

(51) Int. Cl.⁷ .................. G01C 19/38; F21B 47/022
(52) U.S. Cl. .................................. 33/313; 33/304
(58) Field of Search .................. 33/304, 313, 318, 33/321, 322, 323, 328, 366.11, 366.12, 366.13, 542, 544

(56) References Cited

U.S. PATENT DOCUMENTS

| 3,079,696 A | 3/1963 | Van Rooyen |
|---|---|---|
| 3,883,788 A | 5/1975 | Storey, Jr. |
| 4,052,654 A | 10/1977 | Kramer et al. |
| 4,071,959 A | 2/1978 | Russell et al. |
| 4,454,756 A | 6/1984 | Sharp et al. |
| 4,537,067 A | 8/1985 | Sharp et al. |
| 4,594,790 A | 6/1986 | Engebretson |
| 4,696,112 A | 9/1987 | Hoffman |
| 4,756,088 A | 7/1988 | Russell et al. |
| 4,987,684 A | 1/1991 | Andreas et al. |
| 5,126,812 A | 6/1992 | Greiff |
| 5,156,056 A | 10/1992 | Pittman et al. |
| 5,349,855 A | 9/1994 | Bernstein et al. |
| 5,396,326 A | 3/1995 | Knobbe et al. |
| 5,432,699 A | 7/1995 | Hache et al. |
| 5,657,547 A | 8/1997 | Uttecht et al. |
| 5,806,195 A | 9/1998 | Uttecht et al. |
| 6,216,804 B1 | 4/2001 | Aumann et al. |
| 6,267,185 B1 | 7/2001 | Mougel et al. |
| 6,347,282 B2 | 2/2002 | Estes et al. |
| 6,548,321 B1 | 4/2003 | Sawyer |
| 6,778,908 B2 | 8/2004 | Martorana et al. |

FOREIGN PATENT DOCUMENTS

WO    WO 03/031912 A2    4/2003

OTHER PUBLICATIONS

US 6,151,553, 11/2000, Estes et al. (withdrawn)
U.S. Appl. No. 10/632,717, filed Aug. 1, 2003, Ash et al.

*Primary Examiner*—Christopher W. Fulton
(74) *Attorney, Agent, or Firm*—Iandiorio & Teska

(57) ABSTRACT

A compact navigation system for a rover is provided. The navigation system includes a housing configured to be transported by the rover; a gimbal system having two or more gimbals that includes at least an outer gimbal connected to the housing and an inner gimbal nested in and connected to the outer gimbal; a solid state three-axis gyro assembly mounted on the inner gimbal; a solid state three-axis accelerometer assembly mounted on the inner gimbal; a gyro logic circuit responsive to the three-axis gyro assembly for producing an inertial angular rate about each gyro input axis; an accelerometer logic circuit responsive to the three-axis accelerometer assembly for producing a non-gravitational acceleration along each accelerometer input axis; and a processor responsive to the gyro logic circuits and the accelerometer logic circuits for determining the attitude and the position of the housing to provide for long term accuracy of the attitude and the position for navigation of the rover.

70 Claims, 15 Drawing Sheets

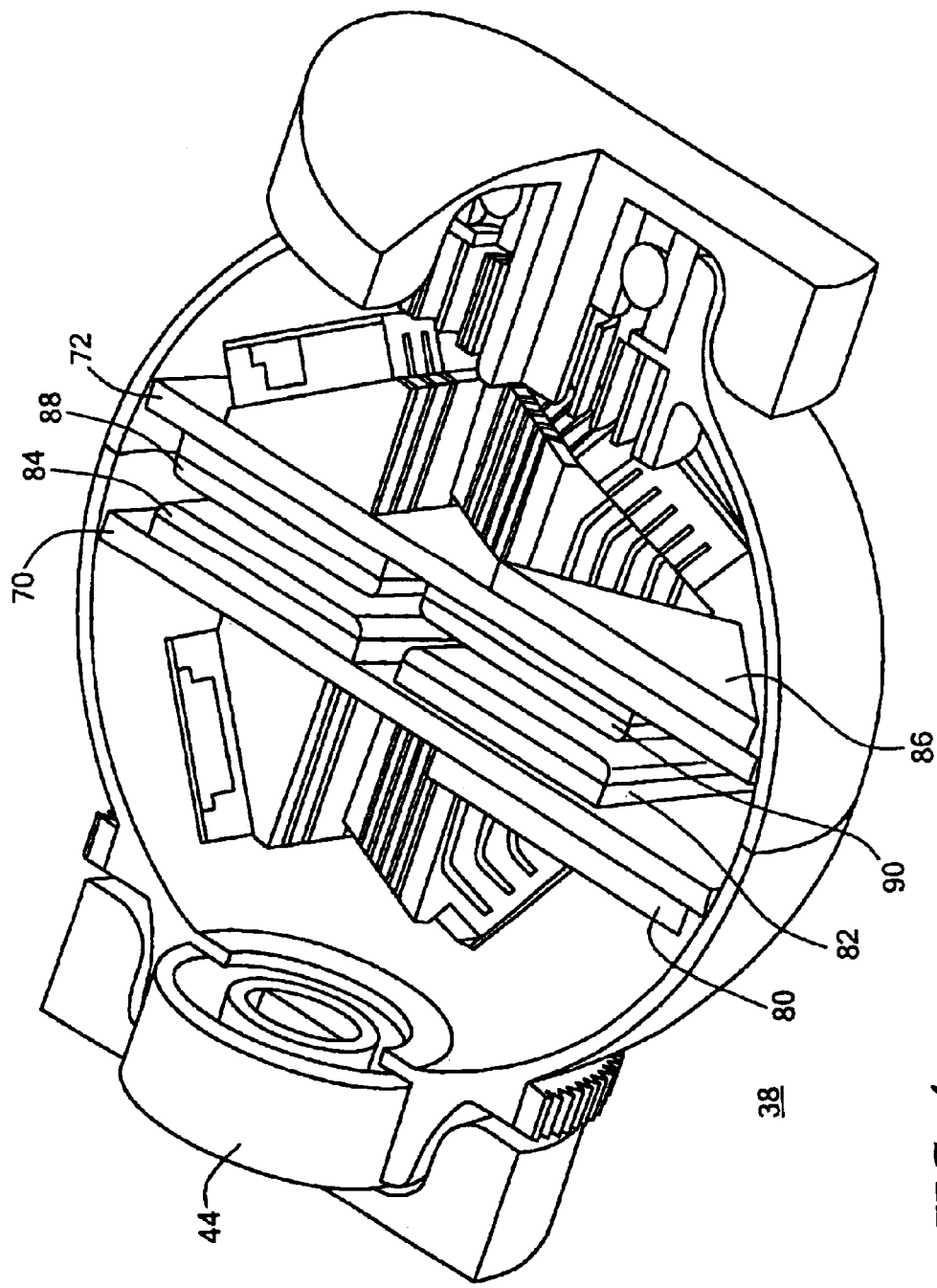

Accel Board Assembly

Gyro Board Assembly

DEAD RECKONING FOR KINEMATIC NAVIGATION
WHILE DRILLING BETWEEN GYROCOMPASSES

KINEMATIC NAVIGATION WHILE DRILLING

INERTIAL NAVIGATION WHILE DRILLING OR LOGGING

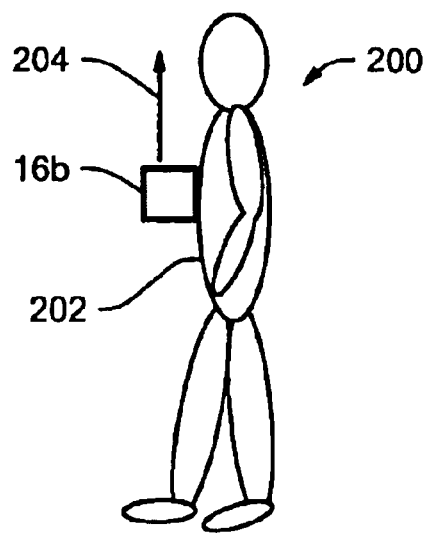
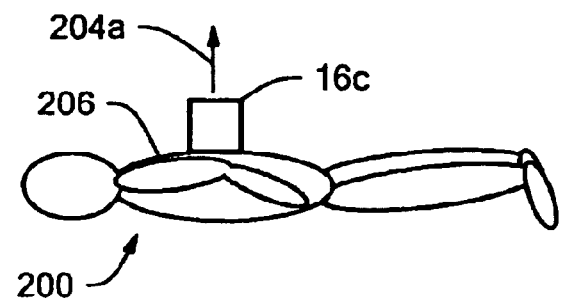
*FIG. 12A*
*FIG. 12B*
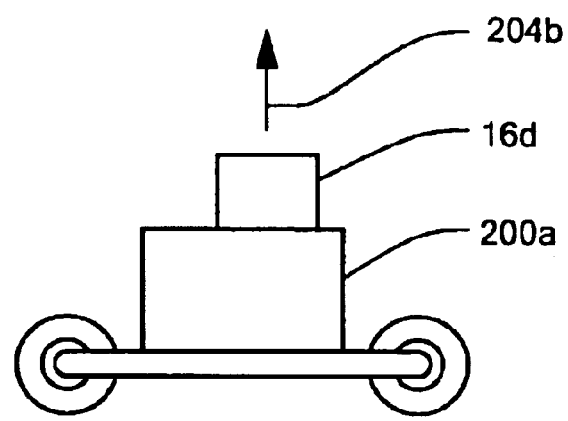
*FIG. 12C*

COMPACT NAVIGATION SYSTEM AND METHOD

RELATED APPLICATION

This application is a continuation-in-part of U.S. patent application Ser. No. 10/632,717, filed on Aug. 1, 2003 entitled "BOREHOLE NAVIGATION SYSTEM", which is herein incorporated by reference.

FIELD OF THE INVENTION

This invention relates to a navigation system for use by a rover. More specifically, the invention relates to a novel navigation system that can determine position and attitude for any orientation of the rover.

BACKGROUND OF THE INVENTION

A navigation system may be used to navigate various things, such as navigating the direction of a drill bit to create a borehole or navigating the direction of a rover.

For several reasons, it is essential to accurately monitor and navigate the direction of the drill bit to create a borehole where desired. One reason is that it is expensive to drill a borehole at a cost of about $500,000 per day. Another reason is that it may be necessary by law for an oil rig to log the location of its boreholes at regular intervals such that the oil rig can be properly monitored.

Many prior systems have attempted to accurately and efficiently monitor the location of the drill bit to determine its location, but each system has had limitations. For example, the internal diameter of a drill pipe may not be large enough to fit the optimal number of typical navigation sensors. To overcome this obstacle, one prior system removes the drill bit from the borehole and lowers a monitoring tool down the borehole to determine its current location. A disadvantage of this system is that it is costly to stop drilling and spend time removing the drill bit to take measurements with the monitoring tool.

In another prior system, single-axis accelerometers are used to determine the vertical orientation of the drill bit. A system such as this, however, does not provide the drill bit's orientation relative to north, which is necessary to determine the full location of a borehole: a system that uses accelerometers is typically only adequate if the oil rig is going to drill a vertical borehole, since an accelerometer system cannot determine north.

In other prior systems, a magnetometer is used to determine the magnetic field direction from which the direction of north is approximated. However, systems such as these must make corrections for magnetic interference and use of magnetic materials for the drill pipe. Additionally, systems that rely only on magnetometers to determine north can suffer accuracy degradation due to the Earth's changing magnetic field.

One prior system uses only a single gimbal for all sensors. However, this system does not allow simultaneous estimation of all sensor biases nor the estimation of the north and the vertical for all borehole orientations. Other systems have used gimbals within a gyro sensor, but this does not provide all axes of observability.

Aside from using navigation systems for drilling boreholes, a navigation system may also be used to navigate the direction of a rover, which may include a land or subterranean rover or a roving person. A preferred navigation system for a rover is small in size and weight because of the limited carrying capacity of the rover. Typical navigation systems, such as the global positioning system (GPS) or other radio navigation aids are not always suitable for many rover applications such as when a land rover or roving person traverses a tunnel, a building, under foliage, in the urban canyon, operates in the presence of jamming or interference, or on the moon, Mars, or another celestial body.

Prior navigation systems have included the use of a small "strapdown" inertial navigation system that does not use gimbals to navigate. If the rover could constantly receive a radio navigation signal, it would be preferable to use a navigation system that includes a strapdown inertial navigation system since it provides a small system that only has to navigate between frequent radio navigation updates. However, inertial navigation strapdown systems typically suffer from long term error growth and thus cannot be used to navigate for long periods of time without updates.

The use of gimbals in an inertial navigation system is desirable to calibrate the sensors and to compensate for the sensor biases such that the system can accurately determine attitude and position. An inertial navigation system using gimbals may be more accurate by a factor of 100 compared to a non-gimbaled strapdown inertial navigation system. Moreover, an inertial navigation system that uses two or more gimbals only requires the sensors to be stable for a few minutes, rather than for days, in comparison to an inertial navigation system that doesn't use gimbals.

BRIEF SUMMARY OF THE INVENTION

It is therefore an object of this invention to provide a more compact and accurate navigation system.

It is a further object of this invention to provide such a navigation system that a rover can use to navigate.

It is a further object of this invention to provide such a navigation system that uses gimbals to navigate.

It is a further object of this invention to provide such a navigation system that uses gyroscopes and accelerometers which have more than a single orientation.

It is a further object of this invention to provide such a navigation system that can be used when a global positioning system or other radio navigation system is not functioning or not available to the rover.

The invention results from the realization that a more compact and accurate navigation system for a rover is effected by using a gimbal system having two or more gimbals, a solid state three-axis gyro assembly and a solid state three-axis accelerometer assembly both mounted on the gimbal system, and a processor responsive to gyro logic circuits and accelerometer logic circuits for determining the attitude and the position of the navigation system. The compact navigation system provides to the rover long term navigation accuracy, including long term accuracy of the attitude and the position.

In one embodiment, the invention features a compact navigation system for a rover, the navigation system including a housing configured to be transported by the rover; a gimbal system having two or more gimbals that includes at least an outer gimbal connected to the housing and an inner gimbal nested in and connected to the outer gimbal; a solid state three-axis gyro assembly mounted on the inner gimbal; a solid state three-axis accelerometer assembly mounted on the inner gimbal; a gyro logic circuit responsive to the three-axis gyro assembly for producing an inertial angular rate about each gyro input axis; an accelerometer logic circuit responsive to the three-axis accelerometer assembly for producing a non-gravitational acceleration along each accelerometer input axis; and a processor responsive to the gyro logic circuit and the accelerometer logic circuit for determining the attitude and the position of the housing to provide for long term accuracy of the attitude and the position for navigation of the rover.

In a preferred embodiment, the axis of the outer gimbal may extend along the rover and has a substantially vertical orientation. The axis of the inner gimbal may be oriented laterally in relation to the outer gimbal axis. The outer gimbal may include a drive motor for rotating the outer gimbal with complete rotary freedom. The inner gimbal may include a drive motor for rotating the inner gimbal. The inner gimbal may be rotatable 180° in each direction. The inner gimbal may include a twist capsule device and the outer gimbal includes a slip ring or rotary transformer device for electrically interconnecting the gyro and the accelerometer logic circuits with the processor. At least one of the gimbals may include a resolver or other gimbal angle readout. The solid state three-axis gyro assembly may include three, one-axis gyros. The solid state three-axis gyro assembly may include a MEMS gyro system. The solid state three-axis gyro assembly may include a laser gyro system. The solid state three-axis gyro assembly may include a quartz gyro system. The solid state three-axis accelerometer assembly may include three, one-axis accelerometers. The solid state three-axis accelerometer assembly may include a MEMS accelerometer system. The solid state three-axis accelerometer assembly may include a quartz accelerometer system. The gyro logic circuit may include a field programmable gate array. The gyro logic circuit may include an application-specific integrated circuit. The accelerometer logic circuit may include a field programmable gate array. The accelerometer logic circuit may include an application-specific integrated circuit. The processor may command rotation of the gimbals to determine north and vertical directions and to calibrate the gyro assembly and the accelerometer assembly biases. The processor may command rotation of the gimbals to determine north and vertical directions and to calibrate the gyro assembly and the accelerometer assembly biases and to calibrate gyro scale factors. The processor may command rotation of the gimbals to a plurality of positions to effect calibration of gyro and accelerometer model parameters. The processor may command carouseling and indexing of the gimbals to average out the inertial navigation errors due to gyro bias errors and inertial navigation errors due to accelerometer bias errors. The processor may periodically command the reversal of the carouseling and indexing of the gimbals to average out inertial navigation errors due to gyro scale factor errors and gyro misalignment errors. The processor may also determine the velocity of the housing on the rover. The compact navigation system may be used in combination with a global positioning system. The processor may be responsive to information from the global positioning system and use the information as an external aid. The processor may use only the navigation system to navigate when information from the global positioning system or other radio navigation system is not available. The processor may make use of other external aids, such as an altimeter or depth meter, a velocity indicator or log, a magnetic compass or magnetometer, etc. The rover may be a land rover. The rover may be a subterranean rover. The rover may be a person.

In another embodiment, the invention features a compact navigation system for a rover, the navigation system including a housing configured to be transported by the rover; a gimbal system having three or more gimbals that includes at least an outer gimbal connected to the housing and an inner gimbal nested in and connected to one or more middle gimbals that are connected to the outer gimbal; a solid state three-axis gyro assembly mounted on the inner gimbal; a solid state three-axis accelerometer assembly mounted on the inner gimbal; a gyro logic circuit responsive to the three-axis gyro assembly for producing an inertial angular rate about each gyro input axis; an accelerometer logic circuit responsive to the three-axis accelerometer assembly for producing a non-gravitational acceleration along each accelerometer input axis; and a processor responsive to the gyro logic circuits and the accelerometer logic circuits for determining the attitude and the position of the housing to provide for long term accuracy of the attitude and the position for navigation of the rover.

In a preferred embodiment, the axis of the inner gimbal may extend laterally in relation to the axis of the outer gimbal when the one or more middle gimbals are at a predetermined reference position. Each of the outer gimbal, the one or more middle gimbals, and the inner gimbal may include a drive motor for rotating the associated gimbal with complete rotary freedom. Each of the outer gimbal, the one or more middle gimbals, and the inner gimbal may include a twist capsule device, a slip ring device, or a rotary transformer device for electrically interconnecting the gyro and the accelerometer logic circuits with the processor. The outer gimbal, the one or more middle gimbals, and the inner gimbal may be equipped with resolvers or other gimbal angle readouts. The solid state three-axis gyro assembly may include three, one-axis gyros. The solid state three-axis gyro assembly may include a MEMS gyro system. The solid state three-axis gyro assembly may include a laser gyro system. The solid state three-axis gyro assembly may include a quartz gyro system. The solid state three-axis accelerometer assembly may include three, one-axis accelerometers. The solid state three-axis accelerometer assembly may include a MEMS accelerometer system. The solid state three-axis accelerometer assembly may include a quartz accelerometer system. The gyro logic circuit may include a field programmable gate array. The gyro logic circuit may include an application-specific integrated circuit. The accelerometer logic circuit may include a field programmable gate array. The accelerometer logic circuit may include an application-specific integrated circuit. The processor may command rotation of the gimbals to determine the north direction and the vertical direction and to calibrate the gyro assembly and the accelerometer assembly biases. The processor may command rotation of the gimbals to determine the north direction and the vertical direction and to calibrate the gyro assembly and the accelerometer assembly biases and to calibrate gyro scale factors. The processor may command rotation of the gimbals to a plurality of positions to effect calibration of gyro and accelerometer model parameters. The processor may command carouseling or indexing of the gimbals to average out the inertial navigation errors due to gyro bias errors and inertial navigation errors due to accelerometer bias errors. The processor periodically may command the reversal of the carouseling or indexing of the gimbals to average out the inertial navigation errors due to gyro scale factor errors and gyro misalignment errors. The processor may also determine the velocity of the housing. The compact navigation system may be used in combination with a global positioning system. The processor may be responsive to information from the global position system and use the information as an external aid. The processor may use only the navigation system to navigate when information from the global positioning system or other radio navigation system is not available. The processor may make use of other external aids, such as an altimeter or depth meter, a velocity indicator or log, a magnetic compass or magnetometer, etc. The rover may be a land rover. The rover may be a subterranean rover. The rover may be a person.

In another embodiment, the invention features a method for navigating a rover on the Earth or other celestial body, the method includes the steps of: providing a housing configured to attach to a rover, the housing including a gimbal system having two or more gimbals that includes at least an outer gimbal connected to the housing, zero or one or more middle gimbals and an inner gimbal nested in and coupled one to the other and to the outer gimbal, the gimbal system including a solid state three-axis gyro assembly and a solid state three-axis accelerometer assembly mounted within the gimbal system; obtaining information about a position of a first point in a trajectory of the rover; if the rover is not initially stationary at the first point, obtaining information about the velocity and the attitude; if the rover is stationary at the first point, determining the velocity due to rotation of the Earth or other celestial body from the position and determining the attitude of the first point in the trajectory of the rover using the three-axis gyro assembly and the three-axis accelerometer assembly by rotating the gimbal system through four or more gyrocompass positions; traversing through the trajectory to a second point in the trajectory while inertially navigating and carouseling or indexing the gimbals; if the rover is stationary at the second point, determining the attitude at the second point in the trajectory using the three-axis gyro assembly and the three-axis accelerometer assembly by rotating the gimbal system through four or more gyrocompass positions to obtain attitude results; and updating navigation of the rover with the attitude results.

In a preferred embodiment, the method of navigating may include the step of calibrating gyro scale factors from the slews between gyrocompass positions. The method may include the step of calibrating gyro and accelerometer system parameters from a plurality of gimbal positions when the rover is stationary on the Earth or other celestial body. The method may include the step of updating the navigation with information from an external aid. Carouseling or indexing the gimbals may be performed for averaging out inertial navigation errors due to gyro bias errors and inertial navigation errors due to accelerometer bias errors. Periodic reversal of the carouseling or indexing motion of the gimbals may be performed to average out the inertial navigation errors due to gyro scale factor errors and gyro alignment errors. Rotating the gimbal system through four or more gyrocompass positions may be performed for determining gyro biases, accelerometer biases, and the components of the gravity and rotation vectors of the Earth or other celestial body. The method may include the step of "zero velocity updating" when the rover is substantially stationary using a set of rotations of the gimbal angles to substantially stationary positions so that errors in level, azimuth, gyro bias, and accelerometer bias and scale factor are observable and can be determined.

The method may include the step of rotating the gimbals to discrete positions including up and down on each accelerometer, and 90 or 180 degrees about the level for determining the gyro bias and an error of the azimuth. The step of updating the estimates may include using a Kalman filter.

BRIEF DESCRIPTION OF THE DRAWINGS

Other objects, features and advantages will occur to those skilled in the art from the following description of a preferred embodiment and the accompanying drawings, in which:

FIG. 4 is an enlarged, more detailed, cross-sectional schematic diagram of the inner gimbal shown in FIG. 3;

FIGS. 12A–12C are schematic views of a compact navigation system used with various rovers in accordance with the subject invention;

DISCLOSURE OF THE PREFERRED EMBODIMENT

Figure 1:
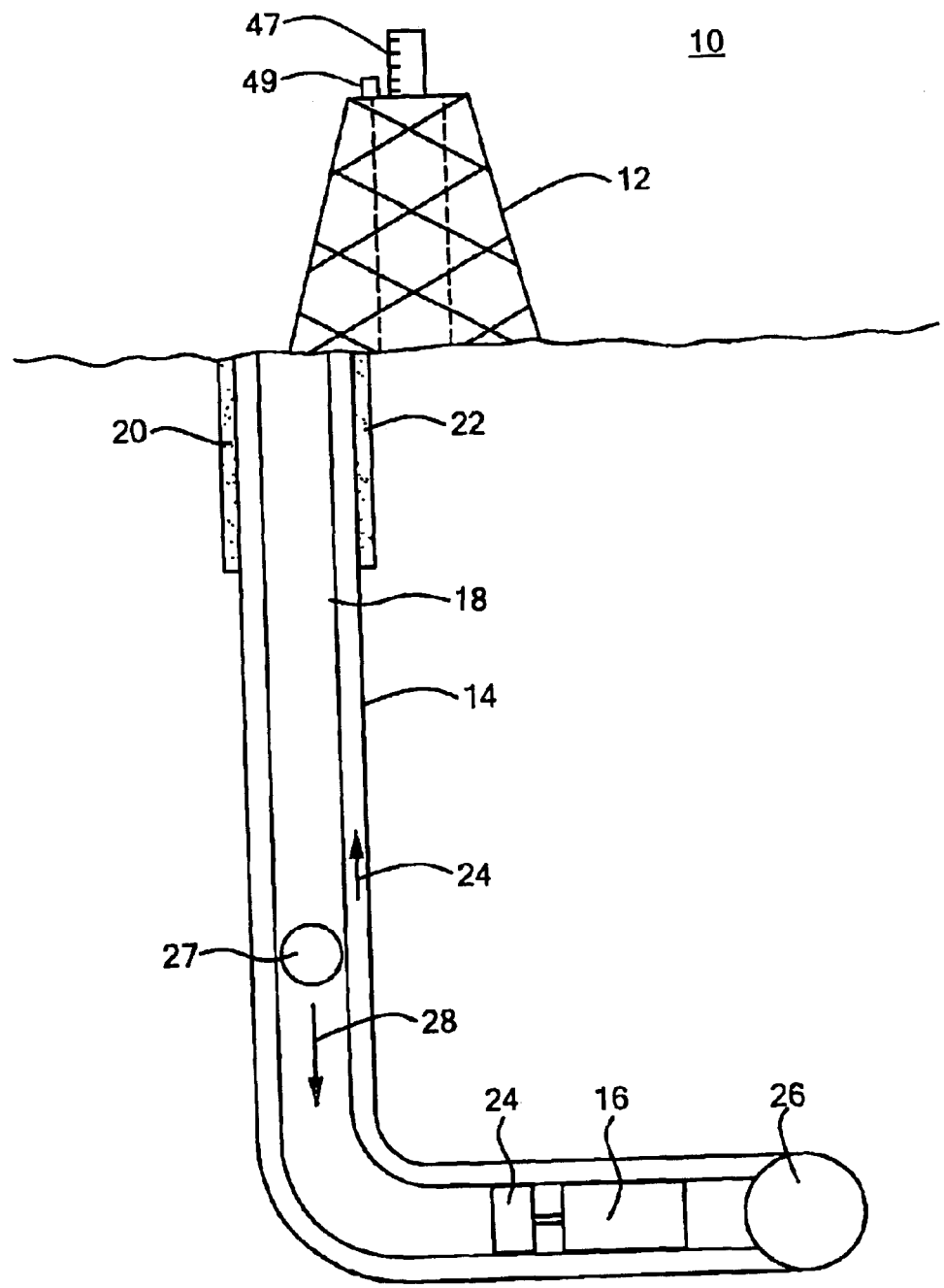
FIG. 1 is a cross-sectional schematic diagram of a drilling system that includes a borehole navigation system in a drill pipe.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a drilling system 10 that includes drilling rig 12 in borehole 14, and borehole mitigated navigation system 16. Drilling rig 12 may be located on top of an ocean surface or on a land surface. Borehole 14 includes one or more connected drill pipes 18 that are surrounded by steel casing 20 and cement liner 22. Navigation system 16 includes power section generator 24 and is adjacent to drill bit 26. While drilling, the mud flows to drive the drill bit, and also drives DC generator 24. Mud 27 is flowed down the inside of the drill pipe in the direction of arrow 28, and returns up the outside of the drill pipe in the direction of arrow 29 carrying away drill cuttings. Power section 24 provides electrical power to navigation system 16, and charges the battery used when mud is not flowing. The flow of mud stops when drilling is stopped to add a length of drill pipe. Navigation system 16 is configured to determine the vertical orientation and azimuth relative to north of navigation system 16 when drilling is stopped, and to navigate while drilling, such that it can provide the location for drill bit 26, which is located adjacent to navigation system 16. The navigation system may also include a temperature control system (not shown) as disclosed in a related U.S. patent application Ser. No. 10/408,704, filed Apr. 7, 2003, entitled "Environmentally Mitigated Navigation System", which is incorporated herein by reference.

Figure 2:
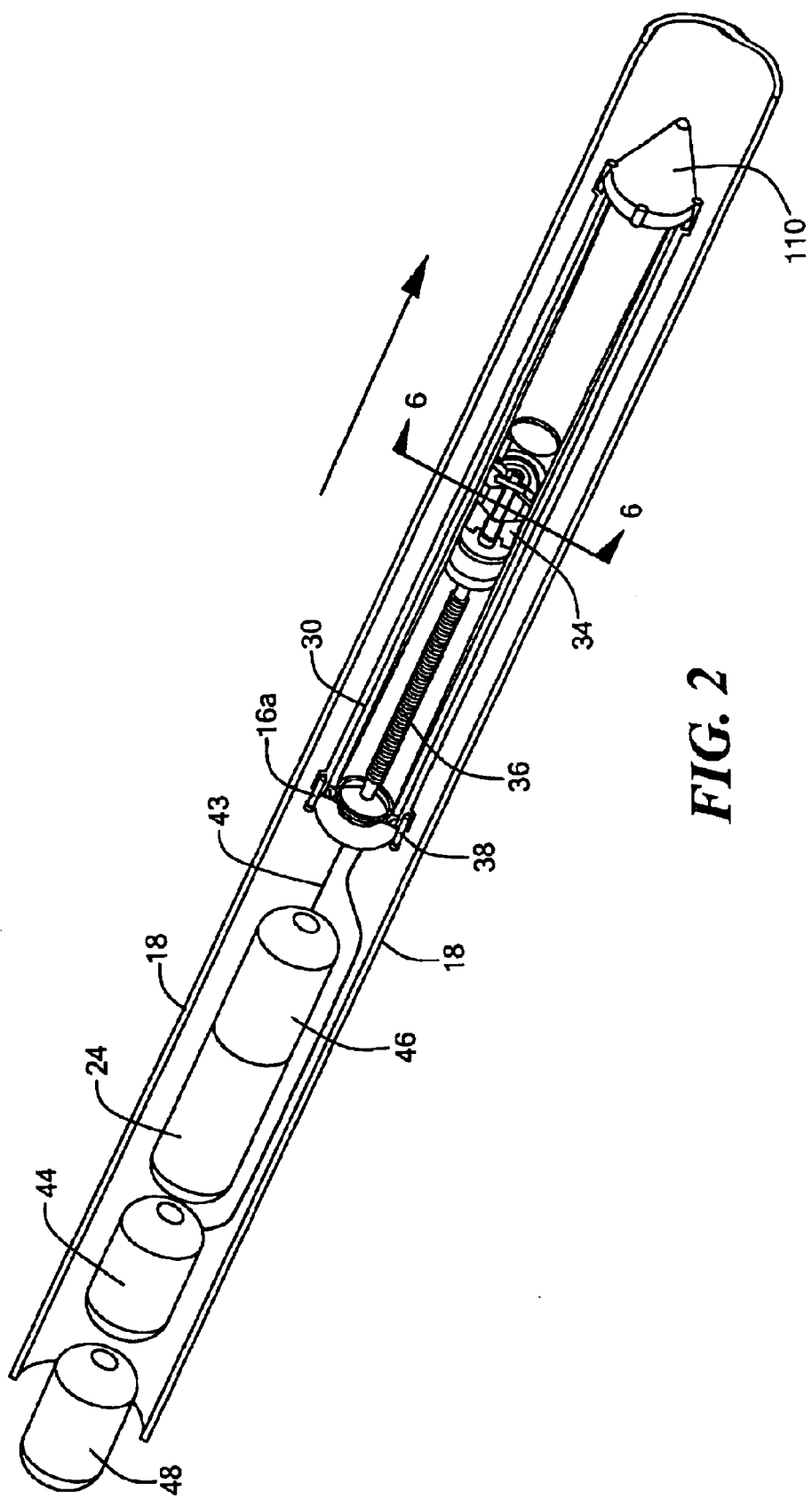
FIG. 2 is a more detailed cross-sectional schematic diagram of the borehole navigation system in a drill pipe shown in FIG. 1.

Navigation system 16a, FIG. 2, includes a housing pressure vessel 32, a gimbal system 34, a flexible heat pipe 36, thermoelectric coolers 38, and an end cap 40. Navigation system 16a may also include a mud pulse data communicator 44 and a ΔL device 48 for obtaining and transmitting the incremental distance advance of drill pipe in the borehole. Mud pulse data communicator 44 is coupled to navigator housing 32 through wire 46 and communicates navigation related information to an external device, such as a drilling rig, through drill pipe 18. ΔL device 48 communicates to navigation system 16a information relating to the incremental change in distance that navigation system 16a has traveled. Flexible heat pipe 36 conducts heat from the gimbal system 34 to the thermoelectric coolers 38.

ΔL device 48 can obtain information about the incremental distance advanced through any of a number of different methods. For example, each section of drill pipe can contain hash marks 47, FIG. 1, that are read by a scanning device 49 on the surface to determine how far each drill pipe has traversed down a borehole. ΔL information can then be transmitted to navigation system 16a through data communicator 44.

Figure 3:
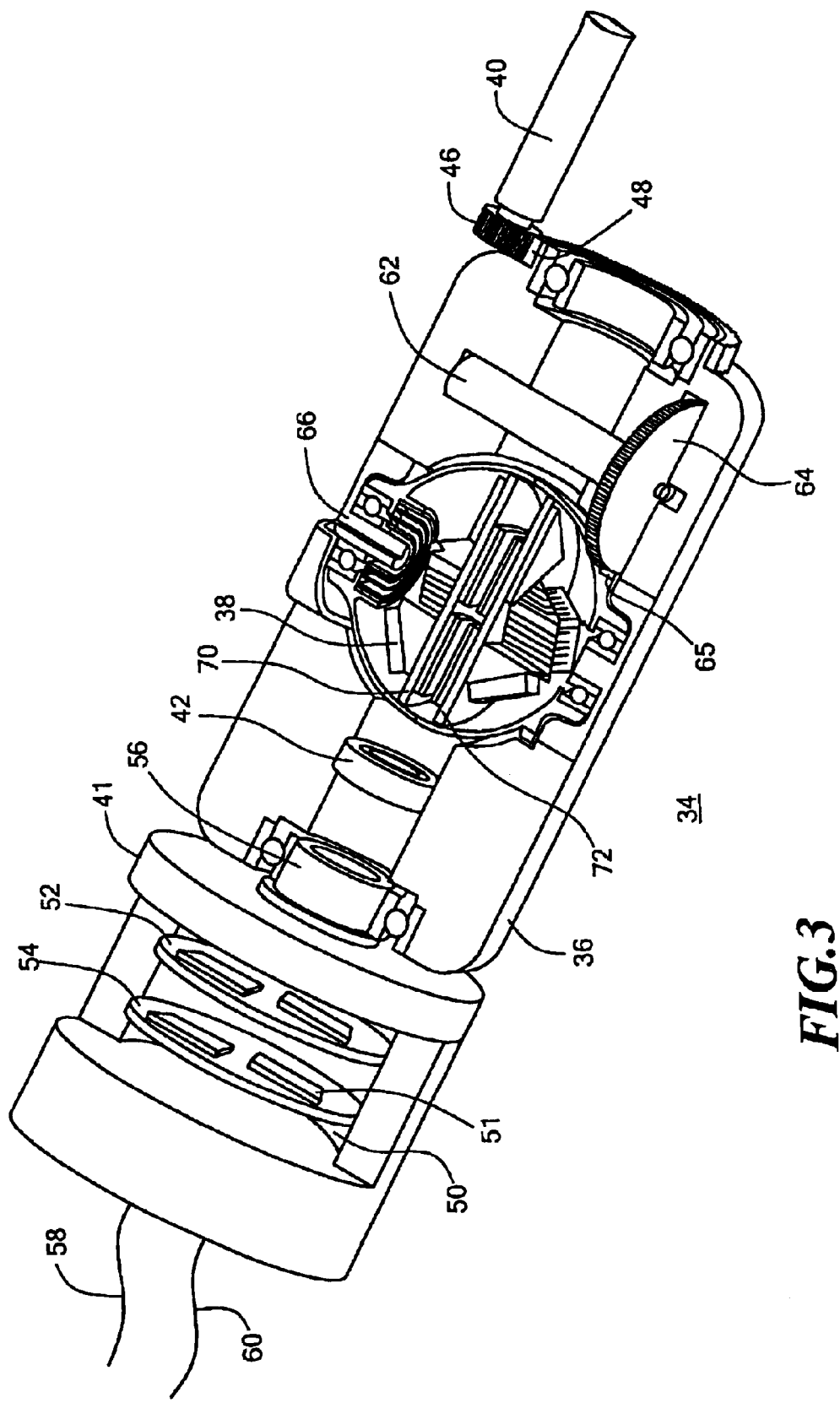
FIG. 3 is an enlarged, more detailed, cross-sectional schematic diagram of the gimbal assembly shown in FIG. 2, where such a dual gimbaled assembly can be used in the rover navigation embodiment as well as in the borehole navigation embodiment.

Gimbal system 34, FIG. 3, includes an outer gimbal 36 and an inner gimbal 38. Outer gimbal 36 rotates about an axis longitudinally to the drill pipe. At one end, outer gimbal 36 is driven by outer axis motor 40, and at another end is supported by outer gimbal support 41. Outer gimbal 36 is driven by an outer gimbal motor 40 that drives a motor gear 46, which drives a gimbal gear 48 to rotate outer gimbal 36. Outer gimbal 36 also includes a resolver or other gimbal angle readout and a slip ring 42 to transmit electrical signals to outside the outer gimbal.

Outer gimbal support 41 includes a cavity 50 that encloses a temperature controller printed circuit board 52 and a motor controller printed circuit board 54. Board 54 includes a processor 51. Electrical signals from outer gimbal 36 are transmitted through slip rings 42 to boards 52 and 54 through an opening 56 in outer gimbal support 41. Outer gimbal support 41 includes wires 58 and 60 to transmit electrical signals to and from DC generator 24, FIG. 2, and mud pulse data communicator 44. Alternatively, rather than using slip ring 42, outer gimbal 36 could include a rotary transformer or other means for transmitting signals with complete rotary freedom.

Inner gimbal 38, FIG. 3, includes an inner axis motor 62 that drives gear 64, which drives inner gimbal gear 65. The inner gimbal 38 includes a twist capsule 66 for transmitting electrical signals from within the inner gimbal to the outer gimbal 36 and may include a resolver or other gimbal angle readout. Twist capsule 66 is not necessary to the invention and could be replaced by a slip ring, a rotary transformer, or other rotary signal transfer device.

Figure 5A:
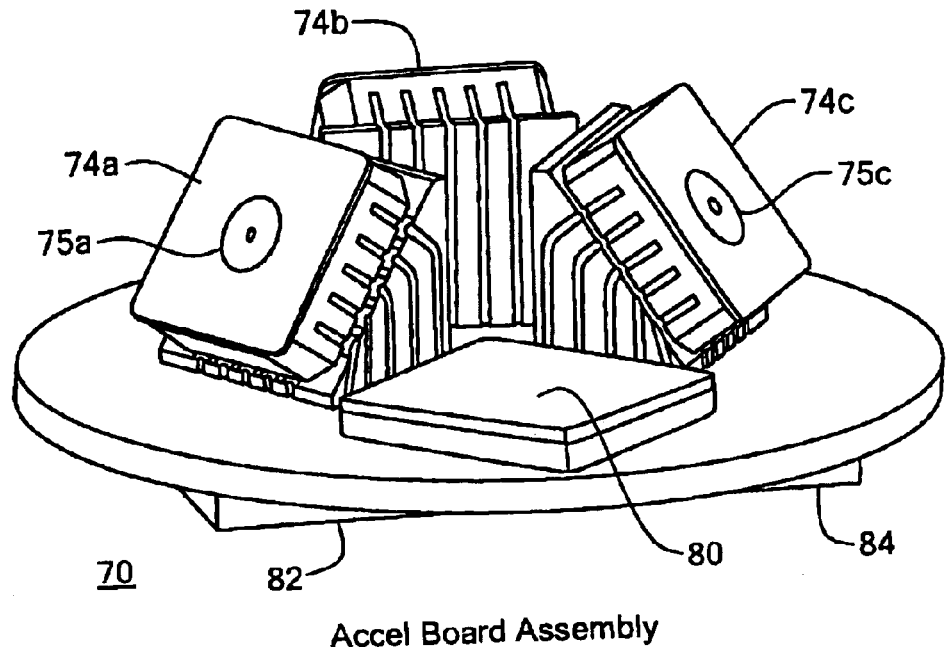
FIG. 5A is a more detailed schematic diagram of the accelerometer board assembly of FIG. 4.
Figure 5B:
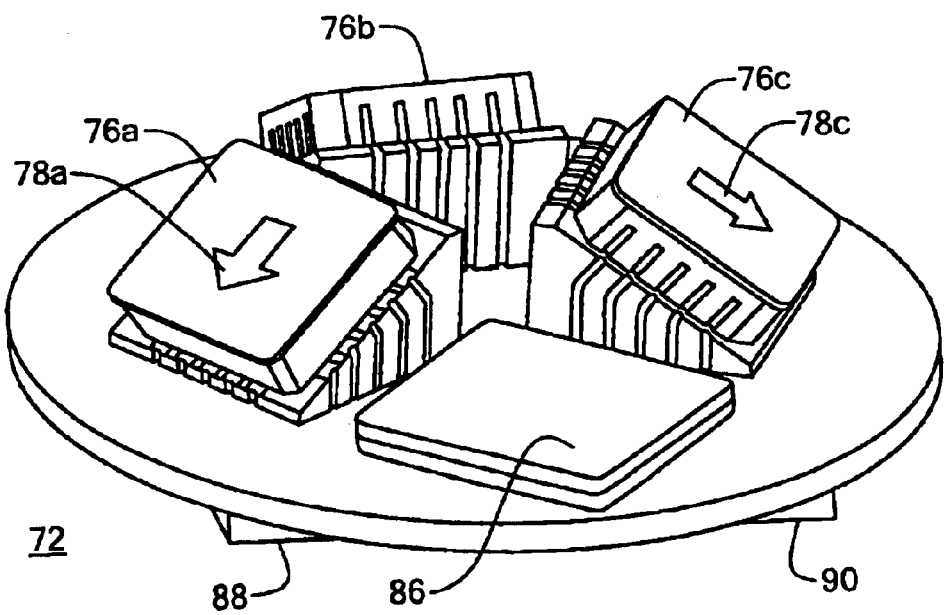
FIG. 5B is a more detailed schematic diagram of the gyro board assembly of FIG. 4.

Inner gimbal 38 includes an accelerometer board assembly 70, FIGS. 4 and 5A, and a gyro board assembly 72, FIGS. 4 and 5B. Accelerometer board assembly 70 includes three accelerometers 74a, 74b, and 74c that are each oriented orthogonally to each other as indicated in part by markings 75a and 75c in which like parts have been given like numbers accompanied by a lower-case "a". Gyroscope board assembly 72 includes three gyroscopes 76a, 76b, and 76c that are also oriented orthogonally to each other as indicated in part by lines 78a and 78c. The accelerometers 74a, 74b, and 74c and gyros 76a, 76b, and 76c may be MEMS sensors, such as those described in U.S. Pat. Nos. 5,126,812, 5,349,855 and 6,548,321, and PCT published application WO 03/031912 A2, all assigned to Draper Laboratory in Cambridge, Mass. or may be laser or quartz sensors.

Accelerometer board assembly 70 includes logic circuits such as a field programmable gate array (FPGA) 80 and application-specific integrated circuits (ASICs) 82 and 84. Gyroscope board assembly 72 also includes logic circuits such as field programmable gate array 86 and application-specific integrated circuits 88 and 90.

Figure 6:
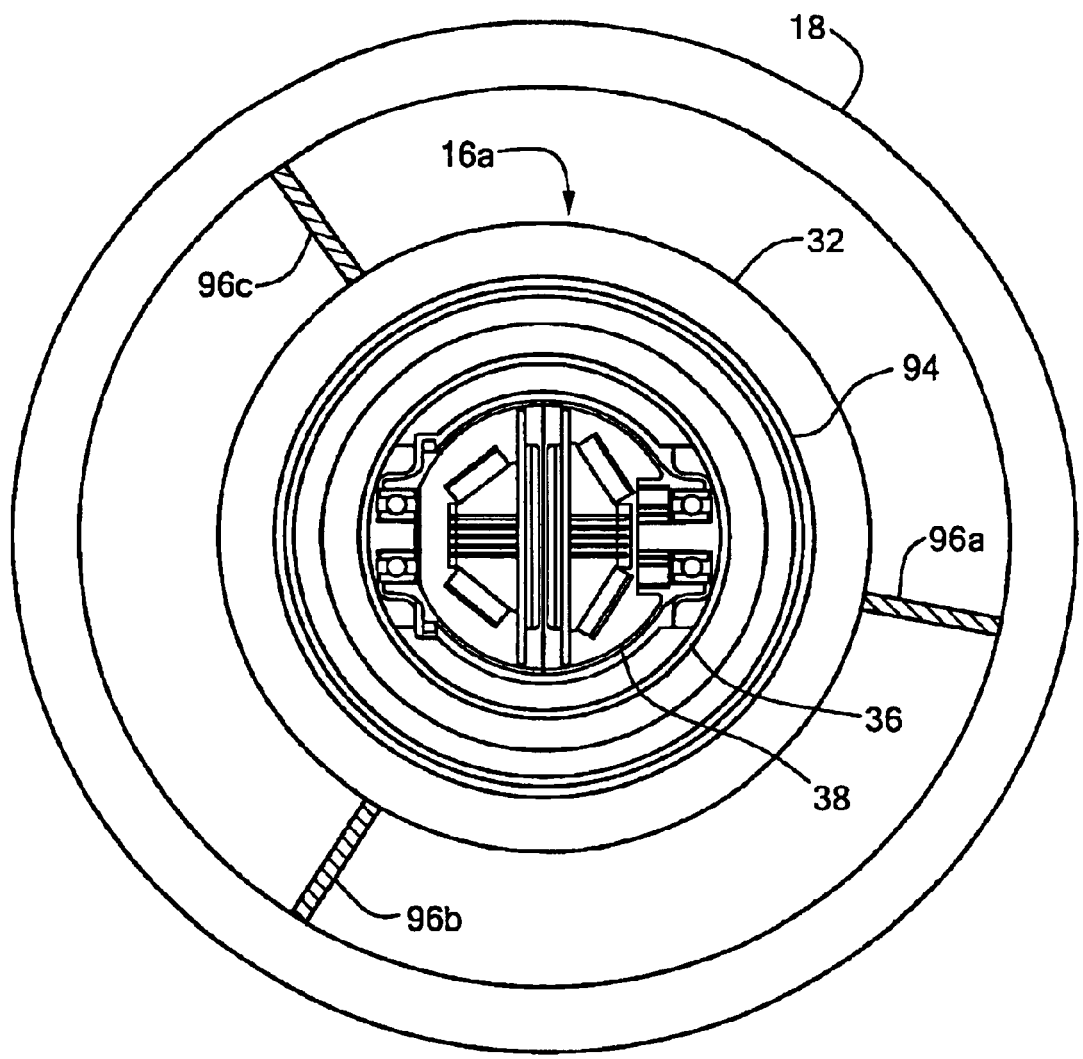
FIG. 6 is a cross-sectional schematic diagram of the borehole navigation system of FIG. 2 taken along the line 6—6 shown in FIG. 2.

Navigation system 16a includes a double-walled Dewar 94, FIG. 6, within housing 32 for providing thermal isolation. Navigation system 16a can be spaced from drill pipe 18 by one or more supports 96a–96c.

Figure 7:
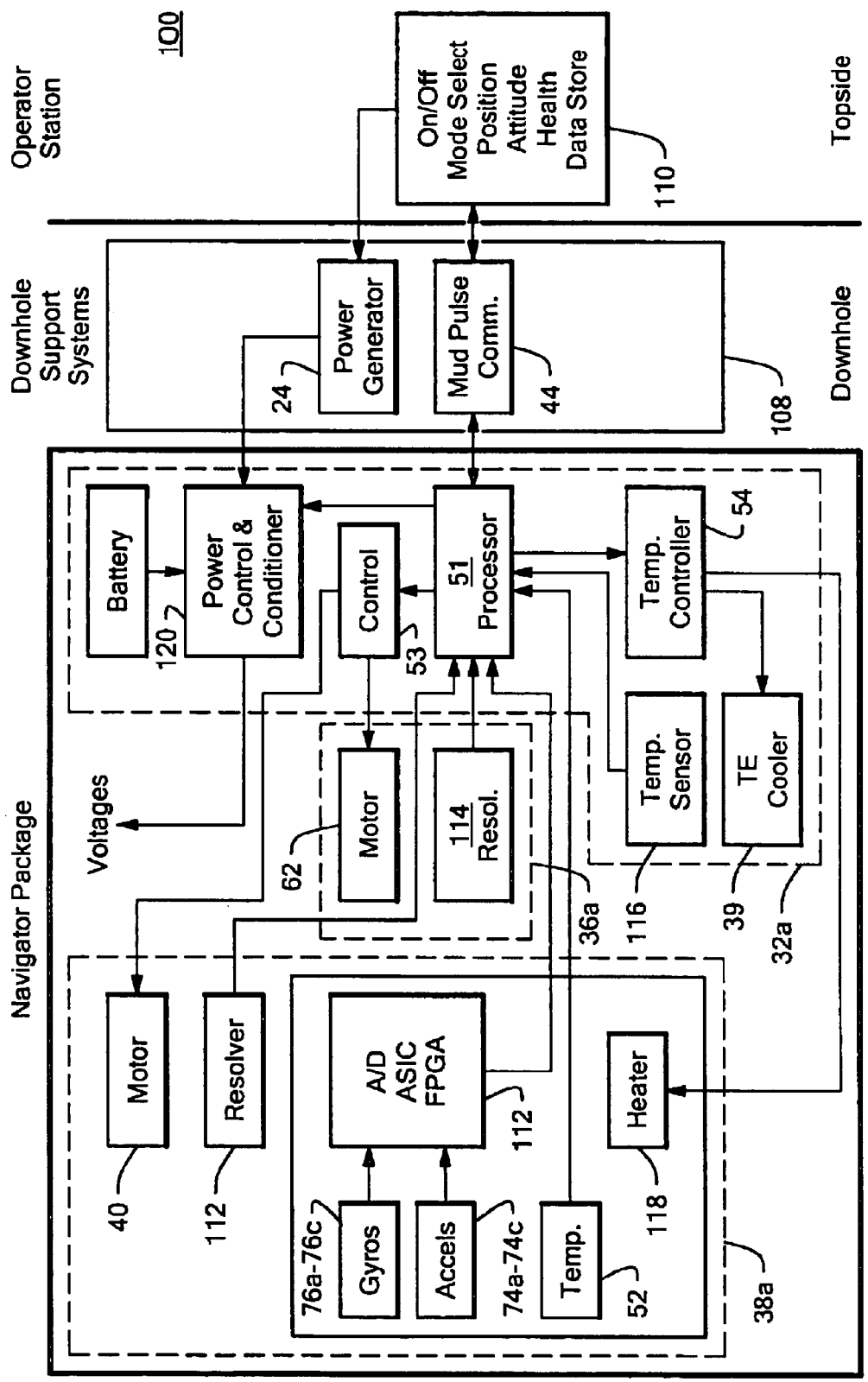
FIG. 7 is a functional block diagram of the borehole navigation system shown in FIG. 2.

A block diagram of navigation system 100, FIG. 7, includes elements from inner gimbal 38a, outer gimbal 36a, housing 32a, down-hole support system 108, and operator station 110. On inner gimbal 38a, information from gyroscopes 76a–76c and accelerometers 74a–74c are sent to inner gimbal logic circuits 111, which include an analog digital converter (A/D), ASICs, and FPGAs. An output signal from a logic circuit 111 is transmitted to processor 51 located on housing 32a. Temperature sensor 52 on inner gimbal 38a transmits temperature information to processor 51. A resolver 114 on outer gimbal 36a and perhaps a resolver 112 on inner gimbal 38a each transmit location information of their corresponding gimbal to processor 51. Processor 51 in turn transmits one or more signals to a control module 53 on housing 32a that transmits a signal to motors 62 and 40 on the outer gimbal 36a and inner gimbal 38a respectively, to control the orientation of each gimbal.

Processor 51 also accepts temperature information from temperature sensor 116 located on housing 32a about the housing temperature. In response to temperature information received from sensors 116 and 52, processor 51 transmits a signal to temperature controller 54 which controls the operations of thermoelectric coolers 39 on housing 32a and heater 118 on inner gimbal 38a. Processor 51 also controls operation of a power control and conditioner module 120 that provides the appropriate voltages to electronics on inner gimbal 38a, outer gimbal 36a and housing 32a.

Mud pulse data communicator 44 communicates information in between processor 51 and operator station 110. Operator station 110 controls the operation of DC power generator 24 which transmits generated power to power control and conditioner 120. Operator station 110 controls general operation of the drilling and navigation system such as turning the drill on and off, selecting the mode of operation of proximity electronics, receiving information on the position and attitude of the navigation system, determining the health of the navigation system, storing data associated with the navigation system, and steering the drill if this is not done down-hole by processor 51.

Figure 8:
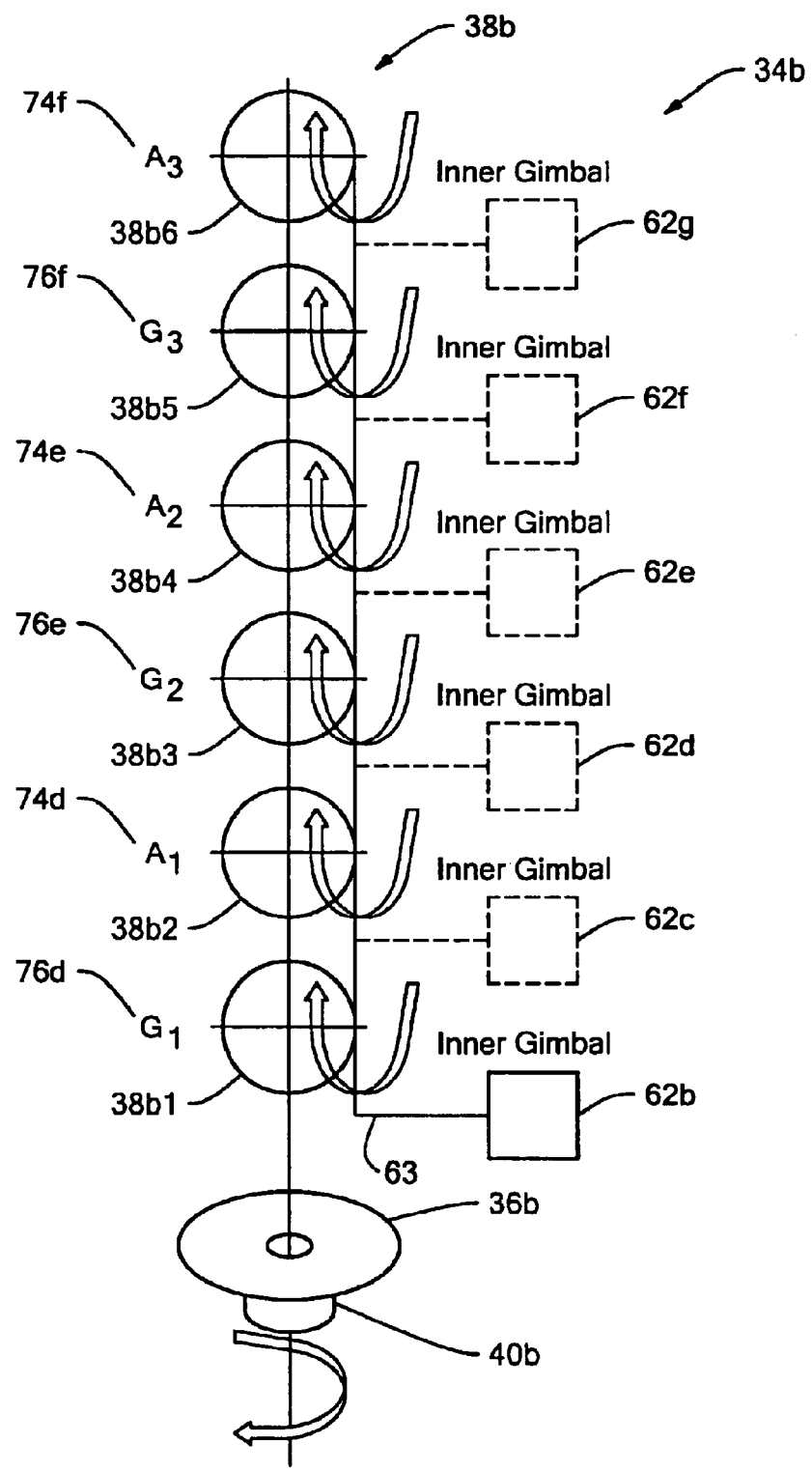
FIG. 8 is a schematic diagram of another embodiment of the borehole navigation system shown in FIG. 1 in which the housing includes one outer gimbal and six inner gimbals.

FIG. 8 shows another embodiment of gimbal assembly 34b that includes one outer gimbal 36b and six inner gimbals 38b1–38b6. Inner gimbals 38b1, 38b3, and 38b5 each have one gyro 76d, 76e, and 76f, respectively, located thereon and inner gimbals 38b2, 38b4, and 38b6 each have one accelerometer 74d, 74e, and 74f, respectively, located thereon. There could be some number other than six inner gimbals, such as three inner gimbals if each inner gimbal contained two sensors, or two inner gimbals if each inner gimbal contained three sensors, or some other number less than or greater than six if there were other numbers of sensors on inner gimbals or if there were redundant sensors. Gimbal motor 40b drives outer gimbal 36b and inner gimbal motor 62b drives each of the inner gimbals 38b1–38b6 through a gear chain 63. Alternatively, six gimbal motors 62b–64g could each drive one of inner gimbals 38b1–38b6. Each accelerometer 74d–74f and each gyro 76d–76f is located on a circuit board in a corresponding inner gimbal 38b1–38b6 and includes proximity electronics on the associated circuit board, including for example an ASIC and gate array. A sensor, such as a gyro or an accelerometer, may be on one side of the circuit board and the programmable gate array and ASIC may be on the other side.

The input axes of each of the gyros 76d–76f are mutually oriented orthogonally to each other, as are the input axes of the accelerometers 74d–74f. The input axes for the three gyros 76d–76f, and separately the three accelerometers 74d–74f, are preferably oriented orthogonally to each other by having the three accelerometers' or gyros' chip planes (if the sensors are MEMS devices) be three intersecting faces of a cube, with each cube face being on a separate gimbal and each gimbal axis being parallel to the diagonal of the cube that bisects the three cube faces. An inner gimbal axis thus makes an angle of arccos(1/sqrt(3))=54.73 degrees with its sensor chip plane. Having the sensor chip plane at an angle to the gimbal axis creates a smaller diameter multi-gimbal structure within the drill pipe diameter.

The three gyro 76d–76f input axes and three accelerometer 74d–74f input axes are preferably mutually orthogonal at the two 180° degree apart inner gimbal stops, and in between if the inner gimbals rotate in parallel, which can be accomplished by using one inner gimbal motor 40b that drives a gear chain which rotates gyros 76d–76f and accelerometers 74d–74f stacked in an alternating configuration as shown in FIG. 8.

Each of the below described navigation while drilling techniques for FIGS. 9, 10 and 11 utilize as part of their approach a gyrocompass while a length of drill pipe is added to the drill string, such as 132 and 136 in FIG. 9, 152 and 162 in FIG. 10, and 172 and 184 in FIG. 11. During a gyrocompass, gyro and accelerometer data are collected at each of the four possible gimbal 180 degree cardinal orientations. Gyro data may also be collected during the slew between gyrocompass orientations. Least squares or Kalman filter estimation, as known to those skilled in the art, is used to determine the gyro and accelerometer biases, the Earth's rotation and gravity vectors, and from the slew data the gyro scale factors. From the Earth's rotation and gravity vectors in the outer gimbal frame, the attitude of the system relative to north and vertical is determined.

Figure 9:
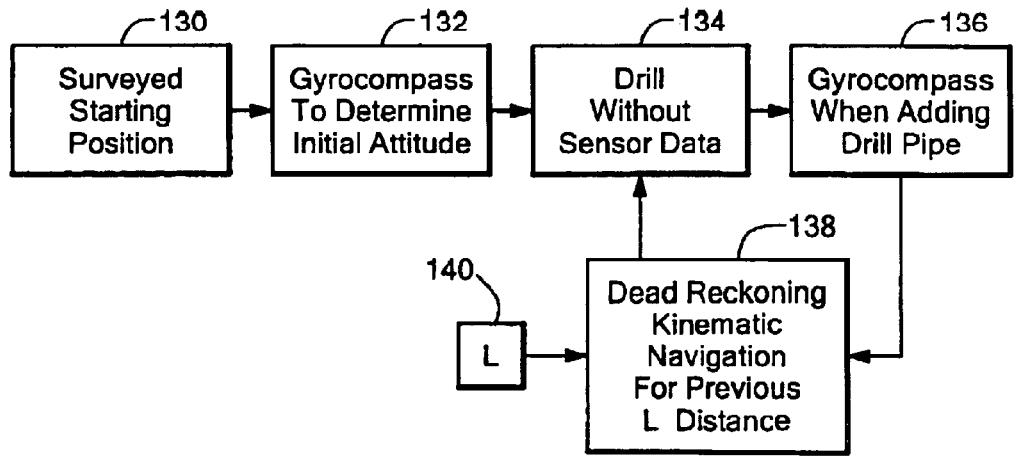
FIG. 9 is a flowchart showing a method of dead reckoning kinematic navigation while drilling that is used with the borehole navigation system of FIG. 2.
Figure 10:
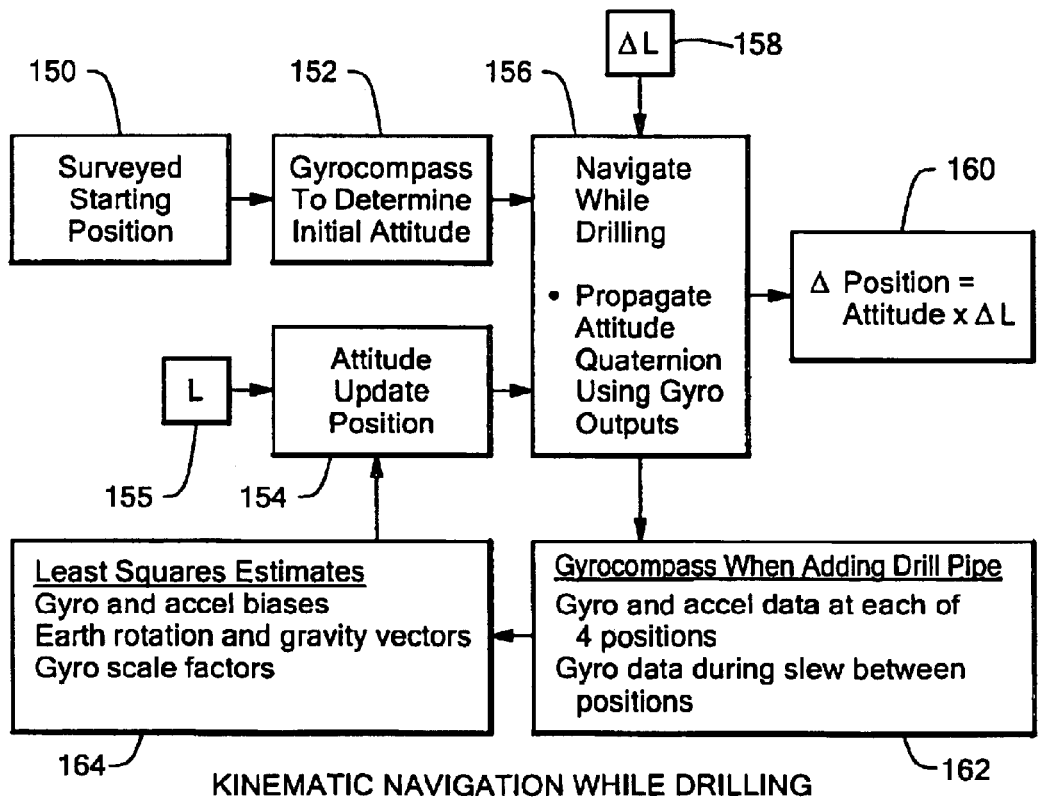
FIG. 10 is a flowchart showing a method of kinematic navigation while drilling that is used with the borehole navigation system of FIG. 2.

A common method for dead reckoning kinematic navigation while drilling begins at step 130, FIG. 9, with obtaining a surveyed starting position of the borehole. Typically, the starting point of the borehole can be very well surveyed, even on the ocean bottom under a drilling platform. For example, global positioning system (GPS) satellite radio navigation equipment can be used to determine the drilling rig position, which is then projected to the starting point of the borehole. At step 132, the initial attitude of the navigation system is determined by gyrocompassing, in which the inner and outer gimbals may be rotated. At step 134, drilling is performed without obtaining additional sensor data. At step 136, gyrocompassing is performed when an additional segment of drill pipe is added. The inner and outer gimbals may be rotated again at step 136. At step 138, the location of the navigation system is determined by using dead reckoning kinematic navigation, which is performed by using attitude information from the gyrocompasses obtained at steps 132 and 136 and the length of pipe (L) that was added to go from step 132 to step 136. The segment of added drill pipe, which may be thirty feet or other lengths, is typically known or can be accurately measured. Alternatively, at step 140, the length of added drill pipe (L) can be obtained from an external source. At step 134, drilling is again performed without taking additional sensor data, and the process 136, etc. repeated.

The navigation method of FIG. 9 does not depend on the particular thirty foot pipe length (presently standard in the drilling industry) chosen in the discussed example. Sometimes drill pipe is added in three thirty-foot segments, or a coil of continuous drill pipe is let down the hole so that drilling might be stopped only every 90 or several hundred feet.

Since borehole drilling will not necessarily follow a smooth minimum-curvature path from one gyrocompass location to the next, as is assumed in dead reckoning kinematic navigation, it may be desirable to navigate while drilling to the next gyrocompass location, in which the position of the initial point is propagated to the second point while drilling. To accomplish this, a method for kinematic navigation while drilling, FIG. 10, can be used, which begins at 150 with obtaining a surveyed starting position of the borehole. At step 152, the initial attitude of the navigation system is determined by gyrocompassing.

Kinematic navigation while drilling is accomplished at step 156, where attitude is propagated using the gyro outputs while the gimbals might be carouseled and/or indexed. Information about the amount the drill pipe advanced, $\Delta L$, is obtained at step 158, and at step 160, the increment in position is determined by multiplying the current attitude determined at step 156 by $\Delta L$. Alternatively, rather than knowing each $\Delta L$ increment while drilling, if it is known that the drill pipe has gone L=30 feet when the drilling stops, and the time duration required for drilling the thirty feet is known, then the kinematic navigation while drilling can be ex-post accomplished after the drilling using saved attitude information during drilling by assuming that the drill bit advanced at a uniform velocity.

At step 162, gyrocompass data is collected while drill pipe is added to the drill string, and the gyrocompass data processing is done at step 164. The navigation while drilling position is Kalman filter updated at step 154 using the gyrocompass attitude information and the length L of the drill pipe L is measured in step 155, and the process is repeated at 156.

Figure 11:
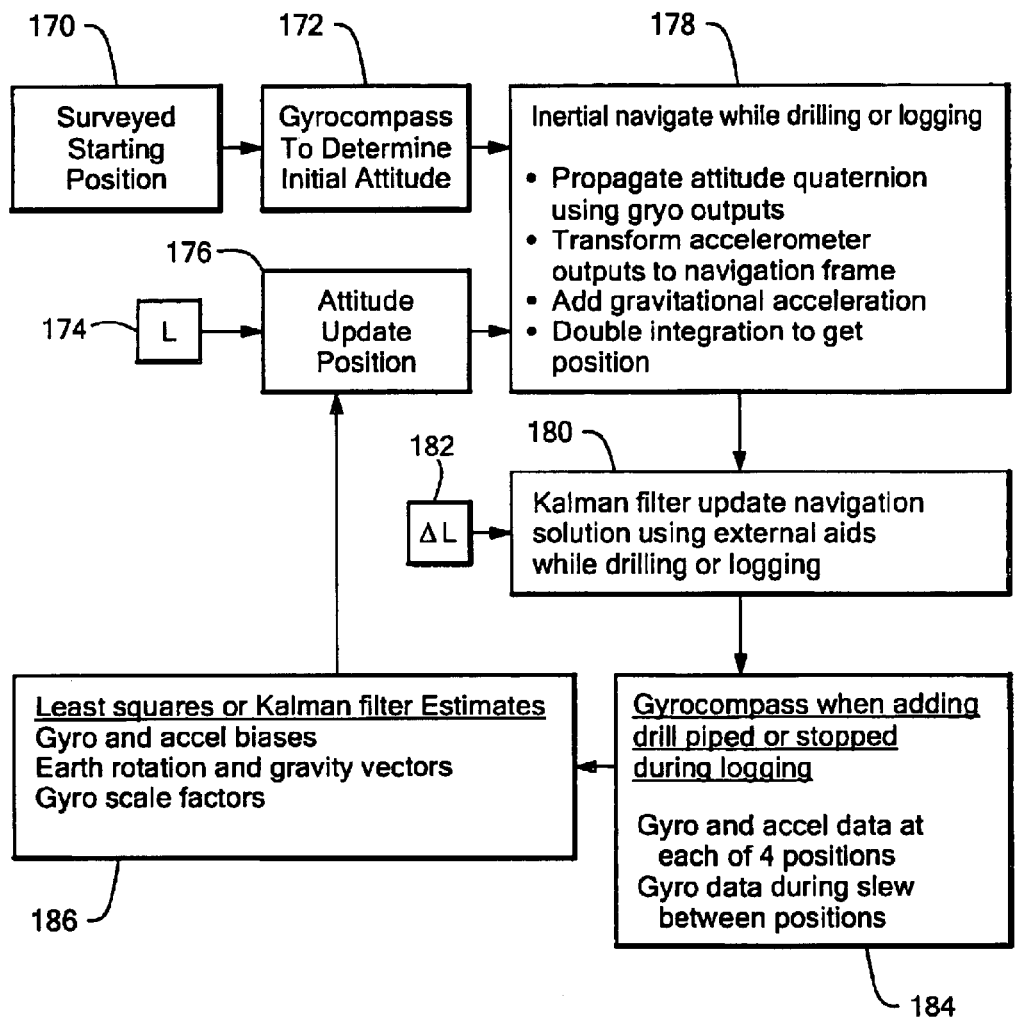
FIG. 11 is a flowchart of a method for inertial navigation while drilling or logging that is used with the borehole navigation system of FIG. 2.

If accelerometer data exists, i.e., if the accelerometer proof masses do not hit their stops during the shock and vibration of drilling, or if they only do so occasionally where navigation can be interpolated through the shock, then inertial navigation while drilling with external aids is preferably used as shown in FIG. 11. The method for inertial navigation, which uses accelerometer as well as gyro information, begins at step 170, FIG. 11, with obtaining a surveyed starting position. At step 172, the initial attitude of the navigation system is determined by gyrocompass.

Using the information obtained at step 172 (or at step 176 after the first position), inertial navigation at step 178 is accomplished by propagating the attitude using the gyro information, transforming the accelerometer outputs to a navigation frame, adding information from a gravitational acceleration model, and double integrating to get the position of the navigation system. At step 180, a Kalman filter update is performed using information about the incremental length of pipe $\Delta L$ obtained at step 182. While a length of drill pipe is added at step 184, gyro and accelerometer data are obtained during the gyrocompass scenario positions, and at step 186 a least squares or Kalman filter estimate is performed to determine the gyro and accelerometer biases, the Earth's rotation and gravity vectors, and gyro scale factors. At step 176, the attitude and position are Kalman filter updated using the length of pipe L information at 174, which result is used at step 178 to continue inertial navigation while drilling. The gimbals might be carouseled and/or indexed while inertially navigating while drilling.

With the method of FIG. 11, incremental pipe advance information $\Delta L$ used in the external aid Kalman filter update prevents the unbounded growth of inertial navigation errors, and typically gets similar propagation errors as that obtained in kinematic navigation. However, inertial navigation could have smaller error propagation because the accelerometer data provides extra information, provided that the accelerometers are not hitting their stops. An occasional overshock event can be tolerated, because the drill pipe advance is typically very slow and an occasional accelerometer outage can be interpolated through.

For inertial navigation, a model of the Earth's gravitation field is preferably used to add to the non-gravitational acceleration measured by the accelerometers. The deflection of the vertical due to gravity anomalies also is preferably modeled down the borehole to correctly interpret the result of vertical determination by the accelerometers in a gyrocompass.

Gimbal Operation

In one embodiment of navigation between gyrocompassing, dual orthogonal gimbals 36 and 38, FIG. 3, can be commanded to rotate ±180° between stops, with a latch mechanism at each gimbal position. Thus, accurate gimbal readout and motion control is not needed if indexing only is utilized. However, in another embodiment, two, three or more gimbals continuously carousel during navigation between gyrocompassing.

The preferred hybrid method of operating the gimbals is with outer gimbal 36 capable of continuous multi-360° revolutions with slip rings and gimbal angle readout, and with inner gimbal 38 orthogonal to the outer gimbal capable of doing a +180° rotation, dwelling, and then a −180° rotation, etc., between stops with wire twist capsule and with or without gimbal angle readout. Inner gimbal 38 can be stopped at other positions, such as 90° between the 180° apart stops.

Continuous rotation of outer gimbal 36 and discrete indexing of inner gimbal 38 is preferable because the space available along the longitudinal axis of drill pipe 18 allows a more complicated outer gimbal 36 structure that permits drill pipe rotation during drilling to be converted to the desired carouseled motion by servoing the outer gimbal to the gyro integrated angle outputs plus the desired carousel angle motion. The simplified structure of inner gimbal 38 is consistent with the restricted diameter in drill pipe 18, and is adequate to allow the required gyrocompass scenarios. During navigating while drilling, continuous carouseling +360° and −360° of the outer gimbal, and discrete indexing +180° and then −180° of the inner gimbal, averages out the effects of gyro and accelerometer bias errors, and unwinds the effects of gyro scale factor errors insofar as the carousel and indexing motions is concerned.

Gyrocompassing Method

When drilling is stopped to add a length of drill pipe, a gyrocompass and other sensor calibration operation may be performed using data obtained at and between four cardinal gimbal positions 180° apart, as follows:

(1) At the first gimbal position (all gimbal angles zero), high rate data is collected and digitally filtered for a period of time from all sensors, which can include three orthogonal gyros, three orthogonal accelerometers, and a three-axis magnetometer if available. This period of time generally is on the order of one minute but can be greater or smaller depending on the trade between accuracy of attitude and drill delay time;

(2) Then the outer gimbal is commanded to rotate or index for +180° in about 1 or a few seconds more or less, as controlled by the gimbal angle readout (or between stops if readout does not exist). Since the rotation is for a precise 180°, data collected during this rotation and subsequent rotations can be used to calibrate gyro scale factors for gyros at known non-orthogonal input axis (IA) orientations relative to the gimbal directions. Hence, none of the three orthogonal gyro IAs should be orthogonal to both gimbal axis directions. For instance, one IA can be parallel to the outer gimbal when at the cardinal inner gimbal orientations and the other two IAs can be at 45° angles to the inner gimbal, or some other more equally spaced non-orthogonal-to-gimbal orientation for the orthogonal set of gyro input axes, such as in FIGS. 4 and 5B;

(3) Data is collected at the second gyrocompass orientation for a minute more or less;

(4) The inner gimbal is indexed +180° between its stops with data being collected during the rotation;

(5) Data is collected at the third gyrocompass orientation for a minute more or less;

(6) The outer gimbal is indexed or rotated −180° with data being collected during the rotation. It is important for calibration reasons that the outer gimbal be rotated −180° rather than +1800°, even though the outer gimbal has complete rotary freedom. The effects of gyro bias and the Earth's rotation rate increases the magnitude of the integral of the gyro output in a 180° rotation for one direction of rotation, and decreases this magnitude for the other direction of rotation. Thus even if not included exactly correctly in analyzing the data, the gyro scale factor calibration using the combined +180° and −180° slews is insensitive to these effects;

(7) Data is collected at the fourth gyrocompass orientation for a minute more or less; and (8) The inner gimbal is indexed −180° with data being collected during the rotation, where the second inner gimbal rotation has to be in the opposite direction of the first, because of the inner gimbal stops and for the same reasons as described in step (6).

Gyrocompass Data Processing

From the data at the four fixed gyrocompass orientations compensated for thermal variations, the gyroscope, accelerometer, and possibly magnetometer biases are calibrated, and the vector components of the local vertical gravity, of the Earth's rotation angular velocity, and possibly of the Earth's magnetic field in the outer gimbal frame may be calculated, as described below. These quantities may also be estimated from the data obtained during continuous rotation of the gimbals or at other positions. The accuracy of the Earth's gravity vector estimate depends on the short term stability of the accelerometer biases and the long term stability of the accelerometer scale factors, whereas the accuracy of the Earth's angular velocity estimate depends only on the short term stability of the gyro biases and scale factors, since the gyro scale factors are calibrated in the slew between gyrocompass positions.

The data from MEMS gyroscopes and accelerometers may be A/D sampled at up to approximately 5 MHz. Digital signal processing and digital filtering is performed on the data with output to processor 51 in FIG. 7 at approximately 600 Hz or 1 kHz. At each gyrocompass position, the gyro angle rate data and the accelerometer acceleration data at the 600 Hz or 1 kHz sample rate are multiplied by the sample time interval and accumulated to get the accumulated gyro angle output and the accumulated accelerometer velocity output as functions of time. The slopes of least squares straight line fits to the accumulated data gives the average gyro rate data and the average accelerometer acceleration data at each of the four gyrocompass positions for three orthogonal gyros and three orthogonal accelerometers. Or some other filter, such as a Kalman filter, can be used to get the average of the sensor outputs at each gyrocompass position.

If the gyrocompass information is used to determine azimuth, the assumption is preferably made that drill pipe 18 is stationary during the gyrocompass operation. Since the drill pipe is lifted off the bottom of the hole when a length of pipe is added, there could be some rotation of the drill pipe. The magnetometer data could be biased in its measurement of the Earth's magnetic field direction, but the change in magnetometer direction determination between the start and end of data taking at each gyrocompass position and across all four gyrocompass positions can be used to correct the gyro data and the accelerometer data for the rotation of the drill string during the gyrocompass operation, if there were a three-axis magnetometer in the system.

A better alternative would be to extend a brake against the borehole wall to prevent the drill pipe from rotating during the gyrocompass operation. However, the use of a brake might not be possible. For instance, when drilling from a ship that is not rigidly attached to the ocean bottom, the ship and drill pipe could be going up and down with wave motion. The motion of the ship could be very accurately monitored with sub-centimeter accuracy phase tracking GPS receivers, and this information sent to the navigation system at the bottom of the drill pipe, if adequate communications exist. Therefore, the period, phase, and amplitude (after modeling of the elasticity of the drill pipe) of the up and down motion and any excited rotary motion would be known and appropriate signal processing could separate out the DC levels of the gyroscope and accelerometer outputs. Long enough dwells at each gyrocompass position could also be used to separate out the DC values of the sensor outputs at each gyrocompass position.

In the following, the formulas are given for gyrocompassing assuming no rotation.

The transformation from the inner gimbal frame to the outer gimbal frame is given by:

$$\begin{bmatrix} 1 & 0 & 0 \\ 0 & \cos\theta_o & \sin\theta_o \\ 0 & -\sin\theta_o & \cos\theta_o \end{bmatrix} \begin{bmatrix} \cos\theta_i & \sin\theta_i & 0 \\ -\sin\theta_i & \cos\theta_i & 0 \\ 0 & 0 & 1 \end{bmatrix} \quad (1)$$

where $\theta_i$, $\theta_o$ are the inner and outer gimbal angles, respectively.

Assume that the gyro and accelerometer input axes (IA) in the inner gimbal frame have the orientations $$IA_1 = \begin{bmatrix} 1 \\ 0 \\ 0 \end{bmatrix}, IA_2 = \begin{bmatrix} 0 \\ \cos 45° \\ \sin 45° \end{bmatrix}, IA_3 = \begin{bmatrix} 0 \\ -\sin 45° \\ \cos 45° \end{bmatrix} \quad (2)$$

with $IA_1$ parallel to the outer gimbal axis at the cardinal gyrocompass positions and $IA_2$ and $IA_3$ at 45° angles to the inner gimbal axis.

Let $(\omega_1, \omega_2, \omega_3)$ in the outer gimbal frame be the input to a sensor (Earth's rotation inertial angular velocity for a gyro, specific force or nongravitational acceleration reaction up to gravity pulling down for an accelerometer).

Let $S_j$ be the scale factor and $B_j$ the bias of sensor j (j=1, 2, 3 for gyros and for accelerometers). The output of a triad of sensors, either gyros or accelerometers, at the four cardinal index positions of the gimbals are given in Table 1 below.

TABLE 1

Sensor outputs at dual gimbal gyrocompass cardinal positions

| Position | Sensor 1 | Sensor 2 | Sensor 3 |
|---|---|---|---|
| $\theta_i = 0°, \theta_o = 0°$ | $+S_1\omega_1 + B_1$ | $+S_2\omega_2 \cos 45°$ $+S_2\omega_3 \sin 45° +$ $B_2$ | $-S_3\omega_2 \sin 45°$ $+S_3\omega_3 \cos 45° +$ $B_3$ |
| $\theta_i = 180°, \theta_o = 0°$ | $+S_1\omega_1 + B_1$ | $-S_2\omega_2 \cos 45°$ $-S_2\omega_3 \sin 45° +$ $B_2$ | $+S_3\omega_2 \sin 45°$ $-S_3\omega_3 \cos 45° +$ $B_3$ |
| $\theta_i = 180°, \theta_o = 180°$ | $-S_1\omega_1 + B_1$ | $+S_2\omega_2 \cos 45°$ $-S_2\omega_3 \sin 45° +$ $B_2$ | $-S_3\omega_2 \sin 45°$ $-S_3\omega_3 \cos 45° +$ $B_3$ |
| $\theta_i = 0°, \theta_o = 180°$ | $-S_1\omega_1 + B_1$ | $-S_2\omega_2 \cos 45°$ $+S_2\omega_3 \sin 45° +$ $B_2$ | $-S_3\omega_2 \sin 45°$ $+S_3\omega_3 \cos 45° +$ $B_3$ |

If the orthogonal gyro and accelerometer IA orientations differ from those in equation (2), such as in FIGS. 5A and 5B, because, e.g., of packaging considerations, while still having the gyro IAs not orthogonal to all gimbal axes, then some other expressions than those in Table 1 for the theoretical values of the measurements would result. However, there would still be complete observability into the Earth's rate and gravity vector components in the outer gimbal frame.

Given the accelerometer scale factors (from surface calibrations) and the twelve average accelerometer measurements at four positions, one can then estimate the gravity vector and the accelerometer biases. Given the gyro scale factors either from surface calibrations or from calibration during the slew between gyro positions and the twelve average gyro measurements at four positions, one can then estimate the Earth's rotation inertial angular velocity vector and the gyro biases. Least squares or Kalman filter estimation can be used, where there are no perfect correlations between estimated parameters.

Knowing the local vertical vector and the Earth's rotation angular velocity vector in the outer gimbal coordinate frame, the horizontal north direction is calculated (if away from the Earth's poles). Hence the azimuth and local vertical orientation of the drill bit has been determined, so that the operator can properly steer the drill bit, or the steering can be autonomously done by the computer 51 in the drill pipe (if there is a means to steer at the drill bit or along the drill string in a closed loop).

Borehole Gravimetry

Non-vibrating (pendulous or translational proof mass) MEMS accelerometers may allow local vertical determination with required accuracy, even if the gravity magnitude measurement is not made with sufficient accuracy for geophysical survey purposes. Oscillating type accelerometers, where proof masses put opposing silicon or quartz resonators into tension and compression under acceleration and the measure of acceleration is the difference frequency of the resonators, can possibly have the required long term scale factor stability for determining the gravity magnitude (length of gravity vector measured in the gyrocompass operation) with sub-$\mu$g accuracy, with only short term stability required of the biases for MEMS oscillating accelerometers that fit within the small dual-gimbaled borehole navigation system.

Sub-$\mu$g performance is possible with increased accelerometer proof mass, although the proof mass is thereby more likely to hit its stops during the shock and vibration of drilling. However, the kinematic navigation while drilling approach only needs the gyro data while drilling, whereas the gyrocompass while not drilling needs both the gyro and the accelerometer data, as does aided inertial navigation while drilling.

Calibration of Gyrocompass Scale Factors during Gyrocompass Slews

Calibration of Gyro Scale Factors during Gyrocompass Slews.

From the data taken during gimbal ±180° slews between gyrocompass positions compensated for thermal variations, the gyro scale factors may be calibrated. The thermal sensitivity model coefficients (which may be calibrated topside before drilling commences) have only to provide corrections for small temperature variations over a few minutes.

For a gyro IA along a gimbal rotation axis, the integral of the gyro angle rate data during the gimbal 180° slew should equal 180° plus the effect of bias plus the effect of the Earth's rotation rate during the slew. For a gyro IA at some fixed angle to a gimbal rotation axis such as 45°, the integral of the gyro angle rate data during the gimbal 180° slew should equal 180° cos(45°) plus the effect of bias plus the effect of the Earth's rotation rate during the slew. For a slew into stops for which there are no gimbal angle readouts during the slew, a time scenario can be assumed (as derived from laboratory experiments on gimbal motor performance) for calculating the effect of the Earth's rotation rate during the slew.

Since the integral of a gyro's output from the +180° slew is of the opposite sign from that from the −180° slew (for a gyro not orthogonal to the given gimbal axis), the effects of gyro bias and the Earth's rotation rate will increase one by the same amount that it decreases the other, if the same pattern of time history of gyro IA relative to the Earth's rotation vector is repeated in the reverse direction in the two slews.

The estimate of the gyro scale factor SF given by:

$$SF = \frac{|\text{integral of gryo output for} + 180° \text{ slew}| + |\text{integral of gryo output for} - 180° \text{ slew}|}{2 \times 180° \times \cos(\text{angle of IA to gimbal axis})}$$

is therefore insensitive to the effects of the Earth's rotation rate and the gyro bias.

If the gyro IA is not orthogonal to both pairs of ±180° slews, then the gyro scale factor estimate is preferably taken to be the average of the two estimates, or the weighted average with the weights being the cosines of the angles of the IA to the gimbal axes.

Nominal (topside or last calibration) values for the gyro scale factors are assumed during the gyro estimations as described above for the gyrocompass data processing. Then the resulting gyro bias and the Earth's rotation vector estimates are preferably applied to estimating the gyro scale factors during the 180° slews. These gyro scale factor estimates preferably are then used to repeat the gyrocompass estimates of gyro biases and the Earth's rotation axis direction, and then the gyro scale factor slew estimates are repeated with the new values of gyro biases and the Earth's rotation direction, etc., the iteration continuing until convergence is obtained. Alternatively, a nonlinear least squares estimate can be made of all the parameters simultaneously from all the gyrocompass and slew data combined.

It is assumed that the angles between the sensor axes and the gimbal axes and scale factor, bias, and alignment temperature sensitivities may be calibrated topside by putting the system on a multi-axis test table and slewing and tumbling about various table axes for various MEMS navigation system gimbal orientations and various temperatures. Also, possibly calibrated topside are any accelerometer $g^2$ sensitivities, any gyro g sensitivities, and any gyro scale factor nonlinearities between sensing high slew rates and low earth-rate inputs.

Accuracy of Sensor Data

The accuracy of measurements at a given gyrocompass orientation depends on the gyro rate white noise (which causes angle random walk), the accelerometer acceleration white noise (which causes velocity random walk), other sensor noise processes, and the stability of the accelerometer scale factor. The accuracy of the measurement at a given gyrocompass position will in general improve as the square root of the time at the position. However, the time at a position cannot be increased much beyond one or a few minutes, because four times this dwell time should not be much longer than the time it takes to add a new length of drill pipe, due to the very large cost of any down time during the drilling process.

Since the 180° slew between positions takes much less time than the gyrocompass dwells at the positions, the scale factor calibration can be less accurate than the gyrocompass calibration, offset however by having a larger rate input during the slew. Preferably, there are commensurate times for dwelling at a position and for slewing between positions. For instance, if the gyrocompass accuracy can measure the Earth's rotation vector direction to $10^{-3}$ radians, then the gyrocompass slew calibration should measure gyro scale factor to at least a part-in-a-thousand accuracy, unless the gyro scale factor were adequately stable from the surface calibration. Better scale factor accuracy is desirable for navigating while drilling, but the requirements while drilling can be ameliorated by outer gimbal ±360° carouseling relative to inertial space and by ±180° inner gimbal indexing during drilling, and by external aids (such as from length of pipe going down the drill hole and from magnetometer data, as described below).

The technology of the MEMS gyro allows sub-degree-per-hour gyro resolution (improving with time) and the capability to measure hundreds of degrees-per-second rotations. In one embodiment of a MEMS gyro, the variation in the induced charge on a vibrating capacitor plate from a charge on a stationary capacitor plate is measured, where the same voltage reference that puts the charge on the stationary plate is used as a comparator in the A/D conversion of the voltage from the charge on the vibrating plate. Therefore, the measurement of angle rate is insensitive to first order to the inaccuracy of the voltage reference.

The above described gyrocompassing and calibration scheme and the below described kinematic or inertial navigation schemes between gyrocompasses could be accomplished by carouseling, e.g., slower continuous ±360° rotations about two or more axes. The rapid ±180° indexing on the inner gimbal and ±180' rotation on the outer gimbal with dwells at the cardinal gyrocompass positions is described herein, because it typically results in simpler and more compact gimbal hardware for fitting within the drill pipe.

Carouseling and Indexing to Average Out the Effect of Bias Errors During Navigating while Drilling In order to average out the effect of gyro and accelerometer bias errors during navigation while drilling, the inner gimbal is indexed +180° and then −180° between its stops about every minute. The outer gimbal axis is also carouseled +360° and then −360° at an inertial carousel rate that is half (or some other fraction) of the indexing rate to similarly average out the effect of gyro and accelerometer bias errors. The outer gimbal could be indexed ±180° instead, but since the outer gimbal has continuous rotation capability the carousel approach is preferred. The inner gimbal axis could also be carouseled instead of indexed.

In order to carousel the outer gimbal axis, add an increasing ramp in angle to the integral of the virtual gyro g output to which the outer gimbal control is servoed, and then add a decreasing ramp in angle. Since no gyro IA is necessarily directly along the outer gimbal axis, choose the virtual gyro $g=\lambda_1 g_1 + \lambda_2 g_2 + \lambda_3 g_3$ to have output that is the linear combination of real gyro $g_i$ outputs, which is along the outer gimbal axis. Attitude quaternion propagation is done during indexing and carouseling as well as between indexing.

Servoing the outer gimbal to the gyro integrated angle outputs plus the desired carousel angle eliminates the effect of gyro scale factor errors due to drill pipe rotation. The ±360° outer gimbal inertial carouseling and the ±180° inner gimbal indexing to average out the effect of gyro and accelerometer bias errors also unwinds the effect of gyro scale factor errors due to the carouseling and indexing (but not due to any small lateral angular motion of the drill pipe). If the carouseling were always in one direction, then the effect of gyro scale factor errors due to carouseling would build up continuously, which is why there is a periodic reversal of outer gimbal carousel direction. The existence of stops requires that there is reversal of inner gimbal indexing direction, which is also needed to unwind the effect of gyro scale factor errors due to the indexing motion.

The canceling of the effect of gyro and accelerometer bias errors that are constant during the carouseling or indexing cycle is only exact if the carouseling or indexing is relative to inertial space. This of course occurs with gyro control of the outer gimbal carousel axis, but does not exactly occur for the inner gimbal axis, the small discrepancy being due to any small drill pipe lateral angular rotation and to the Earth's rotation during the short carouseling and indexing cycle durations. This therefore provides only a first order canceling of errors. However this method also may include any manner of moving the gimbals which exactly cancels out the gyro and accelerometer bias errors.

To do carouseling or indexing relative to inertial space, three or more gimbals would be required. Inner gimbal ±180° indexing into stops with latches, with twist capsules and with or without gimbal angle readouts along with outer gimbal ±360° carouseling with slip rings and gimbal angle readout while canceling drill pipe rotation as seen by the sensors is a practical way to get most of the bias error cancellation, gyro scale factor error unwinding, gyrocompassing calibration, and other benefits that multiple gimbals allow, without having more than two gimbals. However, this invention also covers carrying out the described schemes with more than two gimbals either with indexing or carouseling.

Rover Navigation System

The navigation systems described herein may not only be used within a borehole environment, but may be used in any environment, such as, for example, an environment that requires a navigation system having a small size and long term performance requirements with only short term requirements on the inertial sensors. One such environment may be personal navigation or robotics, such as for a land or subterranean rover.

The navigation system of this invention can be configured to be transported by a rover, such as a roving person or a land or subterranean rover. There is shown in FIG. 12A an embodiment of a navigation system 16b for a roving person 200 who has a substantially vertical orientation and may be walking, running, climbing, or seated in a vehicle. Navigation system 16b is attached to the chest 202 of person 200 with the direction of the outer gimbal oriented longitudinally along the length of a person's body as indicated by vector 204. Alternatively, navigation system 16b may be carried or may be attached to the back or any other part of the body with an outer gimbal direction that can generally be regarded as vertically oriented during locomotion. Navigation system 16b can also provide information solutions when the person is crawling, swimming, or tumbling, but a dual gimbaled navigation system better averages out the effects of gyro and accelerometer errors when the person is in a substantially vertical orientation. Navigation system 16b may be used by a soldier on a battlefield; by a person going through tunnels or buildings; by rescue workers in hazardous or disaster situations; by an astronaut on the moon, Mars, or other celestial body; or in other personal navigation applications where radio navigation is not available or available only intermittently because of blockage, jamming, or outages.

Navigation system 16c, FIG. 12B, is attached to a person 200a who has a substantially horizontal orientation and who may be swimming or crawling, such as through a tunnel or on a battlefield, for extended periods of time. Navigation system 16c is attached to the back 206 of person 202 with the direction of the outer gimbal axis perpendicular to the length of the person's body as indicated by vector 204a. Alternatively, navigation system 16c could be carried or attached to any other part of the body such that direction 204a of the outer gimbal axis is substantially vertically oriented during locomotion.

Navigation systems 16b and 16c of FIGS. 12A and 12B, respectively, have their outer gimbal axis oriented substantially along the local vertical direction on the Earth or other celestial body, most of the time. Navigation system 16b or 16c can still provide navigation information when person 200 deviates from the orientations depicted for extended periods of time, but a dual gimbaled navigation system better averages out the effects of gyro and accelerometer errors when on average the person stays near the orientations depicted in FIG. 12A or 12B.

Navigation system 16d, FIG. 12C, may also be attached to a land or subterranean rover 200a, where rover locomotion can be provided by any number of wheels, by legs, or by tracks. Navigation system 16d has an outer gimbal axis direction indicated by vector 204b, which is oriented substantially along the local vertical direction on the Earth or other celestial body most of the time. Navigation system 16d may still provide navigation information when the rover 200a is doing extreme maneuvers such as violent turns and banks, but a dual gimbaled navigation system better averages out the effects of gyro and accelerometer errors when on average it is going straight and level with arbitrary yaw turns and some pitching and rolling. Rover 200a may be used on a battlefield to disarm mines and perform other military tasks; to crawl through tunnels, buildings, hazardous areas, or wreckage from natural disasters; to operate in a factory, warehouse, office facility, or other urban or rural environments; or to operate on the moon, Mars or other celestial body; all without the aid of GPS or other radio navigation aids if such were blocked, jammed, intermittent, or otherwise unavailable.

For most locomotion of rover 200, 200a, navigation system 16b–16d can generally be assumed to have one gimbal axis oriented on average substantially along the local vertical direction on the Earth or other celestial body most of the time. There may be arbitrary azimuthal motion of rover 200, 200a around the local vertical, with limited angular motion in elevation away from the horizontal on average most of the time. In this case, without GPS or other radio navigation aiding, the preferred embodiment for a sized gimbaled inertial navigation system includes two gimbals, with the outer gimbal direction fixed to the rover 200, 200a being substantially along the local vertical direction on average most of the time. Note that for the dual gimbaled borehole navigation system 16, FIG. 1, the preferred outer gimbal direction is along the borehole longitudinal axis, even as that axis goes horizontal, since the longitudinal axis can have arbitrarily large rotations with limited angular motion about the other axes. If a rover 200, 200a does extreme maneuvers, then the preferred embodiment of navigation system 16b–16d may include three or more gimbals.

Navigation systems 16b–16d may include dual gimbal system 34, FIG. 4, which includes a solid state three-axis accelerometer board assembly 70, FIGS. 4 and 5A, and a solid state three-axis gyro board assembly 72, FIGS. 4 and 5B.

Figure 13:
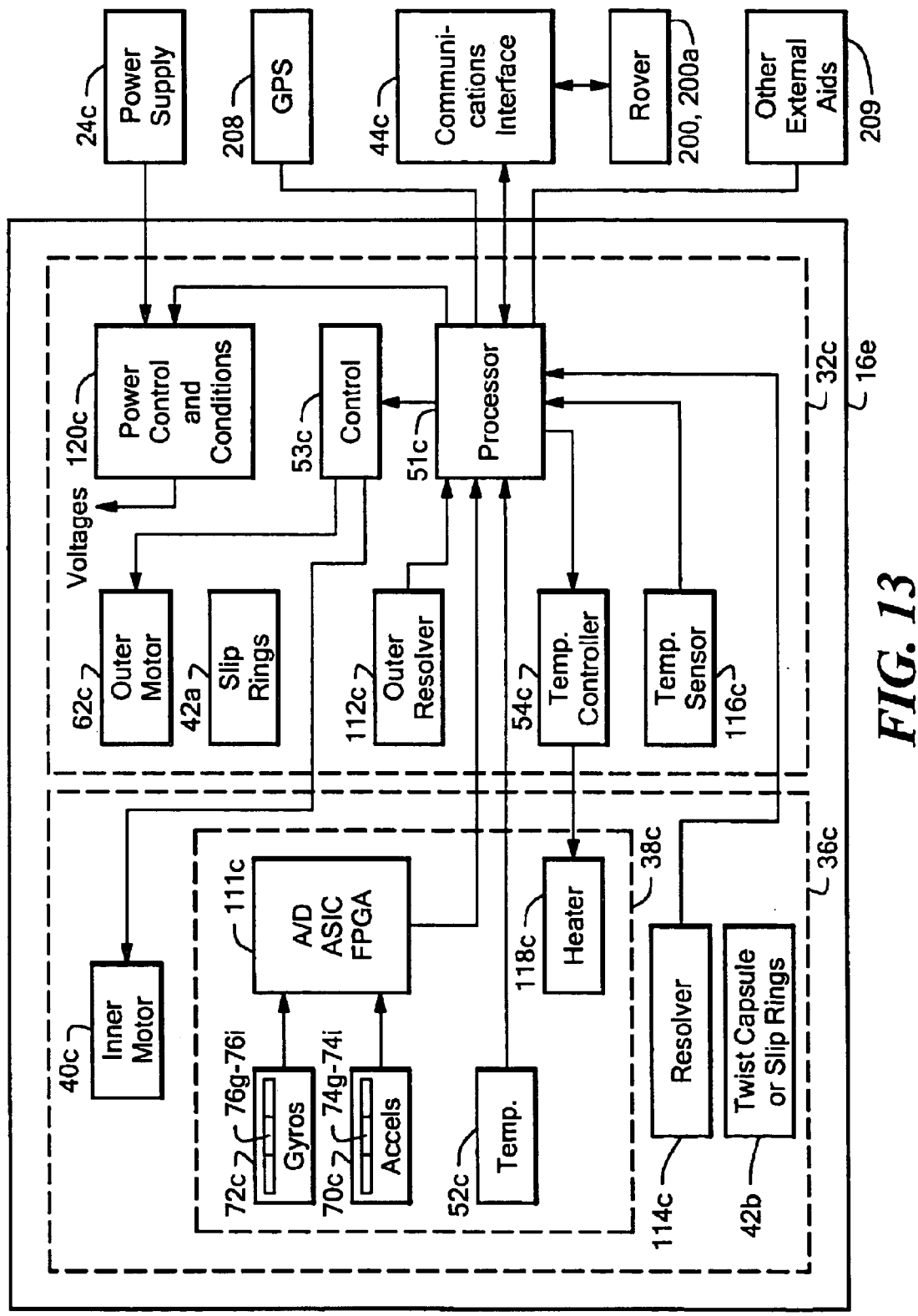
FIG. 13 is a functional block diagram of a dual gimbaled version of the compact navigation system shown in FIGS. 12A–12C.

A block diagram of a dual gimbaled navigation system 16e, FIG. 13, includes inner gimbal 38c, outer gimbal 36c, and housing 32c. Inner gimbal 38c includes a gyroscope assembly 72c, which includes three gyroscopes 76g–76i, and accelerometer assembly 70c, which includes three accelerometers 74g–74i. Information from gyroscope assembly 72c and accelerometer assembly 70c is sent to inner gimbal logic circuits 111c, which include an analog digital converter (A/D), ASICs, and FPGAs. An output signal from a logic circuit 111c is transmitted to processor 51c located in housing 32c. Temperature sensor 52c on inner gimbal 38c transmits temperature information to processor 51c. Inner gimbal 38c may include a heater 118c for controlling the temperature of navigation system 16e. Inner gimbal 38c includes a twist capsule device 42b. Outer gimbal 36c includes a slip ring 42a or rotary transformer device for electrically interconnecting the gyro and accelerometer logic circuits 111c with processor 51.

The solid state three-axis accelerometer board assembly 70c may include a Micro-Electro-Mechanical System (MEMS) accelerometer system, a laser accelerometer system or a quartz accelerometer system. The solid state three-axis gyro board assembly 72c may include a MEMS gyro system, a laser gyro system or a quartz gyro system.

A resolver or other gimbal angle readout 112c on outer gimbal 36c and perhaps a resolver or other gimbal angle readout 114c on inner gimbal 38c each transmit location information of their corresponding gimbal to processor 51c, which may be a microprocessor. Processor 51c in turn transmits one or more signals to a control module 53c on housing 32c which transmits a signal to motors 62c and 40c on the outer gimbal 36c and inner gimbal 38c, respectively, to control the orientation of each gimbal.

Processor 51c accepts temperature information from temperature sensor 116c located on housing 32c about the housing temperature. In response to temperature information received from sensors 116c and 52c, processor 51c may transmit a signal to temperature controller 54c which controls the temperature in inner gimbal 38c, or the signal may be used for temperature compensation in processor 51c without temperature control. Processor 51c controls operation of a power control and conditioner module 120c that provides the appropriate voltages to electronics on inner gimbal 38c, outer gimbal 36c and housing 32c. Power conditioner 120c receives power from power supply 24c. Additional functions that processor 51 may perform are commanding rotation of the gimbals to determine north and vertical directions, to calibrate the gyro assembly and the accelerometer assembly biases and to calibrate gyro scale factors; commanding rotation of the gimbals to a plurality of positions to effect calibration of gyro and accelerometer model parameters; commanding carouseling and indexing of the gimbals to average out the inertial navigation errors due to gyro bias errors and inertial navigation errors due to accelerometer bias errors; periodically commanding the reversal of the carouseling and indexing of the gimbals to average out inertial navigation errors due to gyro scale factor errors and gyro misalignment errors; and determining the velocity of the housing on the rover.

Communications interface 44c communicates information between processor 51c and the rover 200, 200a to which navigation system 16c is attached or carried.

Navigation system 16e may be used in combination with a radio navigation system 208 such as a global positioning system (GPS), Glonass, Loran-C, or Galleleo (not yet deployed). Processor 51c may be responsive to information from radio navigation system 208 and use the information as an external aid during navigation. Alternatively, processor 51c may navigate using information from both navigation system 16e and global positioning system 208 and switch between the two. At the times that information from radio navigation system 208 is not available, processor 51c may navigate using only information from navigation system 16e. Other external aids 209 may be used by processor 51c, such as altimeter or depth meter, velocity meter or log, a magnetic compass or magnetometer, an odometer, terrain, landmark, or map recognition, a star sighting, etc.

The input axes of each of the gyros 76g–76i are mutually oriented orthogonally to each other, as are the input axes of the accelerometers 74g–74i, with no input axis being orthogonal to all gimbal axes. For instance, the input axes for the three gyros 76g–76i, and separately the three accelerometers 74g–74i, can be preferably oriented orthogonally to each other by having the three accelerometers' or gyros' chip planes (if the sensors are MEMS devices) be three intersecting faces of a cube with the inner gimbal axis being parallel to the diagonal of the cube that bisects the three adjacent cube faces. The inner gimbal axis thus makes an angle of arccos(1/sqrt(3))=54.73 degrees with its sensor chip plane. Alternatively, some other gyro and accelerometer input axis orientations can be chosen such that no input axis is perpendicular to both the inner gimbal axis and to the outer gimbal axis when the gimbals are at their null positions such that gyro scale factor calibrations can be facilitated by rotating the outer gimbal and by indexing the inner gimbal between stops 180° apart.

If rover 200, 200a does extreme maneuvers, then the use of a navigation system that includes three or more gimbals is preferable to average out the effects of gyro and accelerometer errors. A three gimbaled system 210, FIG. 14, includes outer 36d and inner 38d gimbals and also includes a middle gimbal 212 that is connected between the outer 36d and inner 38d gimbals. A four gimbaled system, 220, FIG. 15, includes outer 36e and inner 38e gimbals and two nested middle gimbals 222, 224 that are connected to both the outer 36e and inner 38e gimbals. Located within the inner gimbal 38d, 38e in FIGS. 14 and 15 could be the accelerometer 70 and gyro 72 assemblies of FIGS. 5A and 5B, respectively, labeled elec 226 in FIG. 14 and FIG. 15. All three or four gimbals have complete rotary freedom with slip rings (or rotary transformers) for transmitting signals and gimbal angle readouts. The axis of the inner gimbal 38d or 38e extends laterally to the axis of the outer gimbal 36d or 36e, respectively, when the one or more middle gimbals 212, 222, 224 are located at a predetermined reference position.

Figure 16:
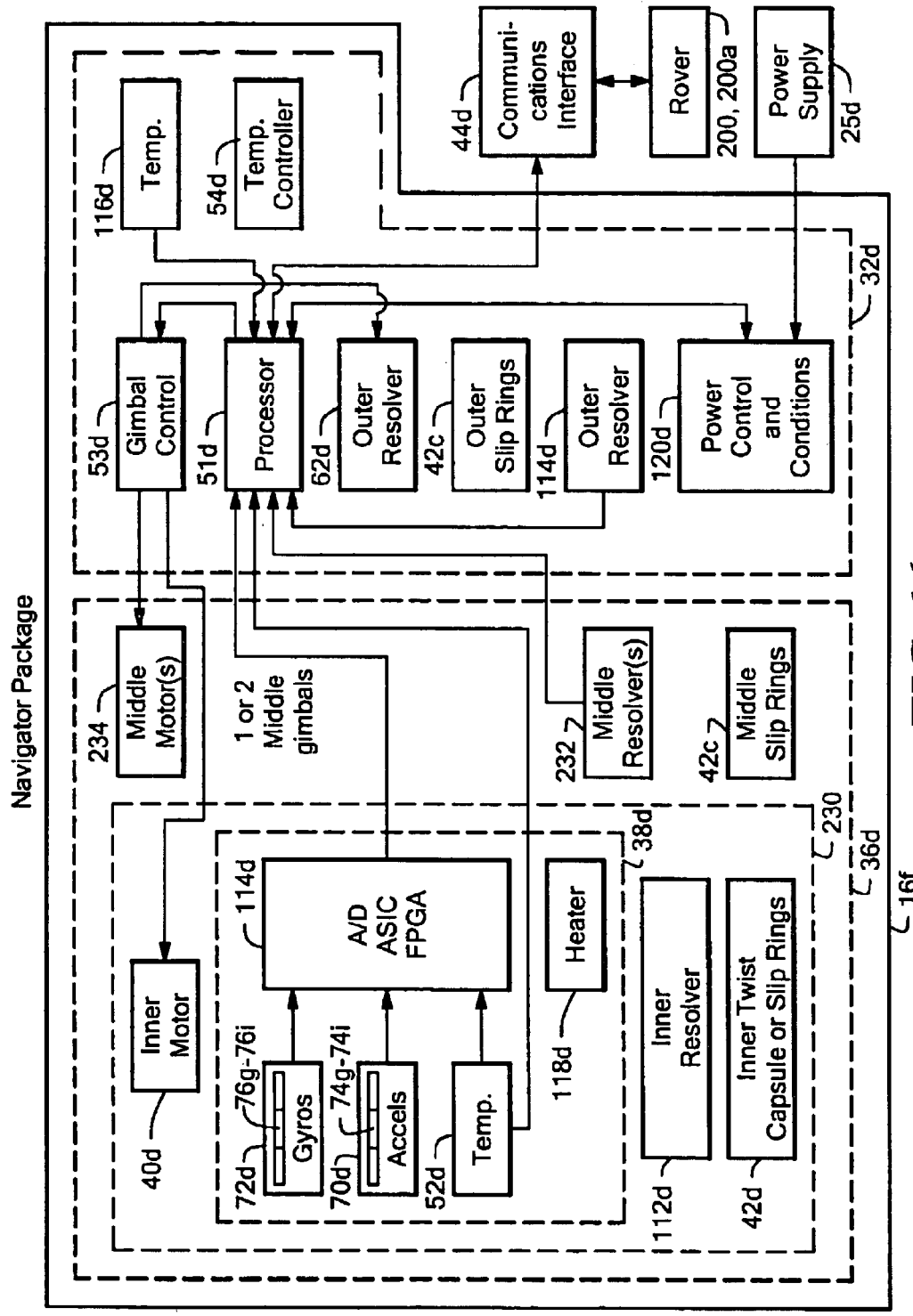
FIG. 16 is a functional block diagram of an alternate embodiment of a compact navigation system of FIGS. 12A–12C in which the gimbal assembly includes three or more gimbals.

A three or more gimbaled navigation system 16f, FIG. 16, includes inner gimbal 38d, outer gimbal 36d, one or more middle gimbals 230, and housing 32d. On inner gimbal 38d, information from gyroscopes 76g–76i and accelerometers 74g–74i are sent to inner gimbal logic circuits 111d, which include an analog digital converter (A/D), ASICs, and FPGAs. An output signal from a logic circuit 111d is transmitted to processor 51d located on housing 32d. Temperature sensor 52d on inner gimbal 38d transmits temperature information to processor 51d. A resolver or other angle readout 114d on outer gimbal 36d, one or more middle gimbal resolvers or other angle readouts 232, and a resolver or other angle readout 112d on inner gimbal 38d each transmit location information of their corresponding gimbal to processor 51d. Gimbal angle readouts besides resolvers could be employed, such as optical encoders. Processor 51d in turn transmits one or more signals to a gimbal control module 53d on housing 32d. Gimbal control module 53d transmits a signal to outer gimbal motor 62d, the middle gimbal motor 234 for each middle gimbal 230, and inner gimbal motor 40d to control the orientation of each gimbal. Preferably, each gimbal can be rotated with complete rotary freedom.

Each of the outer gimbal 36d, the one or more middle gimbals 230, and the inner gimbal 38d includes a twist capsule device 42c–e, a slip ring device, or a rotary transformer device for electrically interconnecting logic circuit 114d with processor 51d.

Processor 51d also accepts temperature information from temperature sensor 116d located on housing 32d about the housing temperature. In response to temperature information received from sensors 116d and 52d, processor 51d may transmit a signal to a temperature controller which controls heater 118d in inner gimbal 38d, or the signal may be used for temperature compensation in processor 51d without temperature control. Processor 51d also controls operation of a power control and conditioner module 120d that provides the appropriate voltages to electronics on inner gimbal 38a, middle gimbals 230, outer gimbal 36d and housing 32d. Communicator 44d communicates information in between processor 51d and the rover 200, 200a to which the navigation system is attached.

Figure 17:
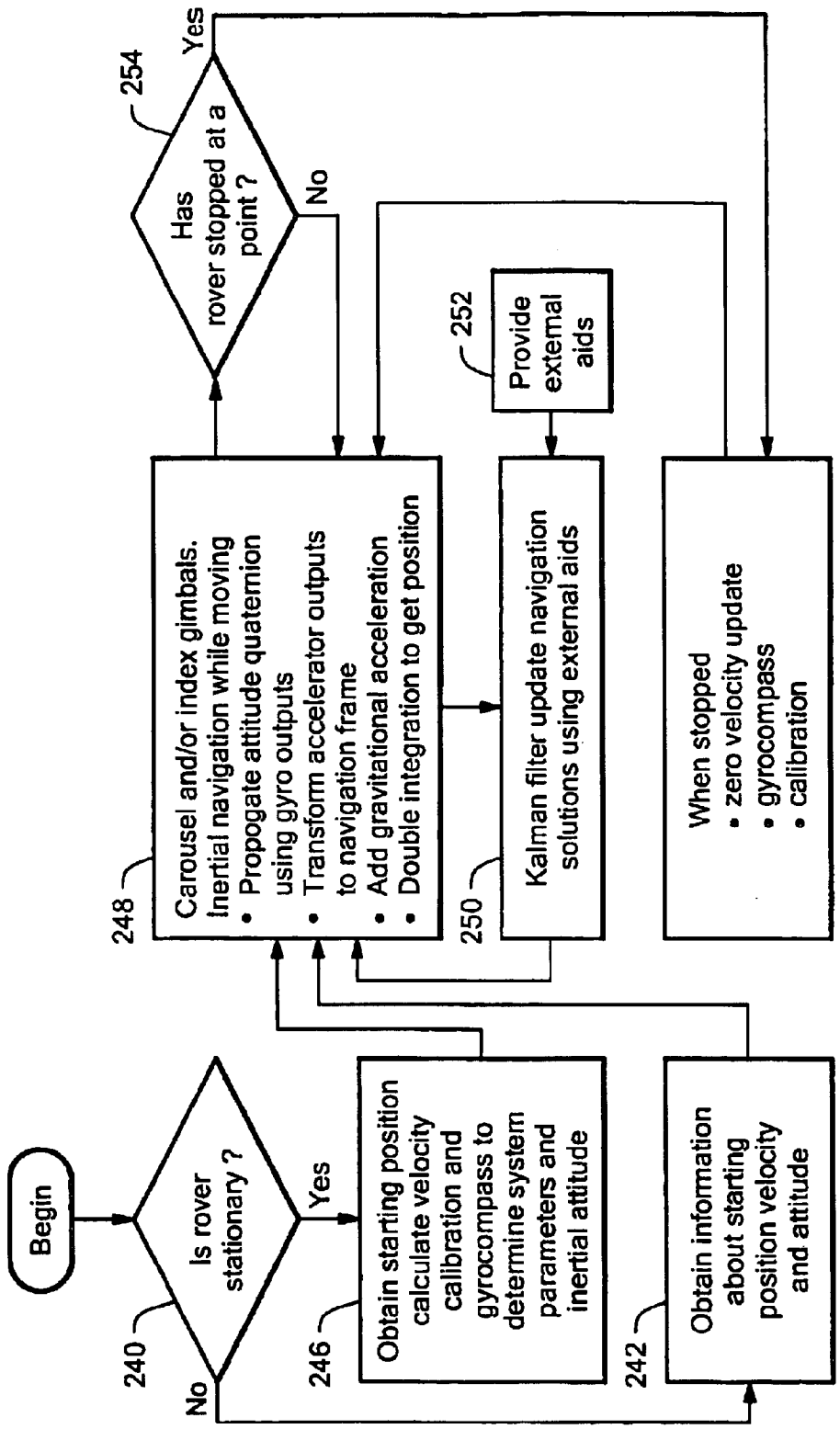
FIG. 17 is a flowchart for a method of navigating using the compact navigation system shown in FIGS. 12A–12C.

A method, FIG. 17, for navigating a rover using a two or more gimbaled navigation system 16b–16d begins at step 240 with determining if the rover is initially stationary at a first point. If the rover is not initially stationary, then information about the starting position, velocity, and attitude of the rover on or in the vicinity of the Earth or other celestial body must be obtained at step 242. If the rover is dispensed from a mother vehicle, the initial velocity and attitude can be transmitted to the navigation system from the mother vehicle. If the rover is determined to be stationary at a first point on the Earth or other celestial body, the inertial velocity can be derived at step 246 from the known position and the known rotation of the Earth or other celestial body, and the attitude is determined by performing a gyrocompass operation. System parameters may also be calibrated utilizing gimbal positioning and rotation scenarios including gyro scale factors from the rotations between gyrocompass cardinal positions, the gyro and accelerometer biases as part of the gyrocompass determination of the components of the Earth or other body rotation and gravity vectors, and other parameters from data at additional gimbal angle positions. As the rover traverses to a second point in its trajectory at step 248, carouseling and/or indexing of the gimbals is performed to average out the inertial navigation effects of gyro and accelerometer bias errors. Periodic reversal of the carouseling and/or indexing motions is also performed to average out the inertial navigation effects of gyro scale factor errors and gyro misalignment errors. While carouseling and/or indexing the gimbals, inertial navigation is performed by propagating the attitude quaternion using the gyro outputs, transforming the accelerometer outputs to a navigation frame, adding the modeled gravitational acceleration, and double integrating to get position and velocity. At step 250, while the rover is traversing, a Kalnan filter update of the inertial navigation solution may be performed using any external aids provided at step 252, such as from an altimeter or depth meter, a velocity indicator or log, a magnetic compass or magnetometer, an odometer, terrain, landmark, or map recognition, a star sighting, or even GPS or other radio navigation system if available, etc. If it is determined at step 254 that the rover has become stationary on the Earth or other celestial body, a calibration and gyrocompass operation can be performed as done in step 246, and then inertial navigation while moving at step 248 recommences.

Also, if the rover is substantially stationary at 246, a "zero velocity update" can be performed in conjunction with a set of rotations of the gimbal angles to substantially stationary positions so that errors in level, azimuth, gyro bias, and accelerometer bias and scale factor are observable and can be determined. These rotations include, but are not limited to: 1) up and down on each accelerometer, and 2) rotation of 90 or 180 degrees about the level for gyro bias and azimuth error determination. Performing the parameter estimation with a Kalman filter allows the zero velocity updates to be performed even if angular movement (such as angular vibration) is being induced by the environment.

Dual Gimbal Operation During Navigation

When the navigation system of FIG. 3 is performing the inertial navigation function for the rover orientations of FIGS. 12A–12C, there could be arbitrary azimuth motion of the rover 200, 200a. Hence outer gimbal 36c preferably has complete rotary freedom, to take out this azimuthal rotation and add a carousel motion. In one embodiment, this is accomplished by computing the integral of the virtual gyro rate output that is along the outer gimbal axis and adding to it an increasing angle between 0° and 360°, and then when 360° is reached a decreasing angle is added in the reverse direction. The outer gimbal torquer is servoed to null this computed quantity. A 360° carousel rotation would take about a minute or a few minutes, in order to average out the inertial navigation errors due to gyro bias errors and inertial navigation errors due to accelerometer bias errors over the carousel period, for those sensor input axis components that are perpendicular to the outer gimbal axis. Periodically reversing the direction of carousel rotation averages out the inertial navigation effects of gyro scale factor errors and gyro misalignment errors for gyro input axis components along the outer gimbal axis.

Simultaneously with the carousel motion of the outer gimbal axis, the inner gimbal axis is periodically indexed +180° and then −180° at a repetition period that is some fraction or multiple of the outer gimbal carousel period. The 180° rotations could be into stops with or without inner gimbal angle readout and with electrical signals transmitted through twist capsules rather than slip rings, to obtain a more compact system. Alternatively, continuous carouseling with periodic reversal could be done on the inner gimbal as well as the outer gimbal. The inner gimbal indexing and outer gimbal carouseling tends to average out the inertial navigation errors due to gyro bias errors and inertial navigation errors due to accelerometer bias errors. The periodic reversal of indexing or carouseling direction tends to average out the inertial navigation effects of gyro scale factor errors and gyro misalignment errors.

The averaging out the inertial navigation effects of gyro and accelerometer bias errors and of gyro scale factor errors and gyro misalignment errors only exactly occurs if the outer gimbal direction were fixed in inertial space during the carousel and indexing periods. The deviation from being so fixed arises from the rotation of the Earth or other celestial body where rover 200, 200a is located, from motion along the surface of the Earth or other celestial body, and from the angular motion of rover 200, 200a relative to the horizontal, where any azimuth motion is canceled and converted to carousel motion by the outer gimbal rotation. If rover 200, 200a is not doing extreme non-azimuthal maneuvers over the carousel and indexing periods, the non-cancellation of inertial navigation sensor error effects is small.

Three or More Gimbal Operation during Inertial Navigation

Figure 14:
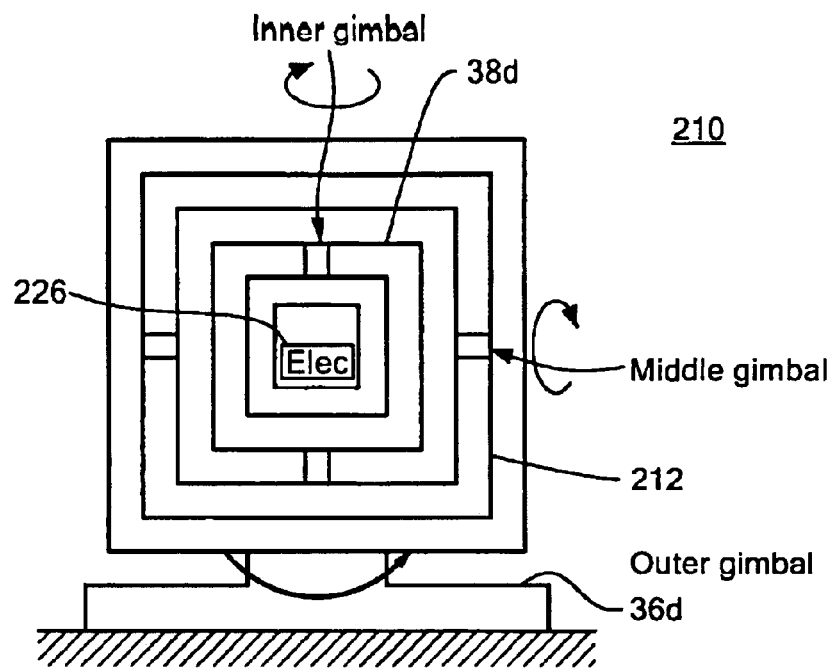
FIG. 14 is a schematic view of an alternate embodiment of a gimbal assembly that includes three gimbals for the compact navigation system shown in FIGS. 12A–12C.
Figure 15:
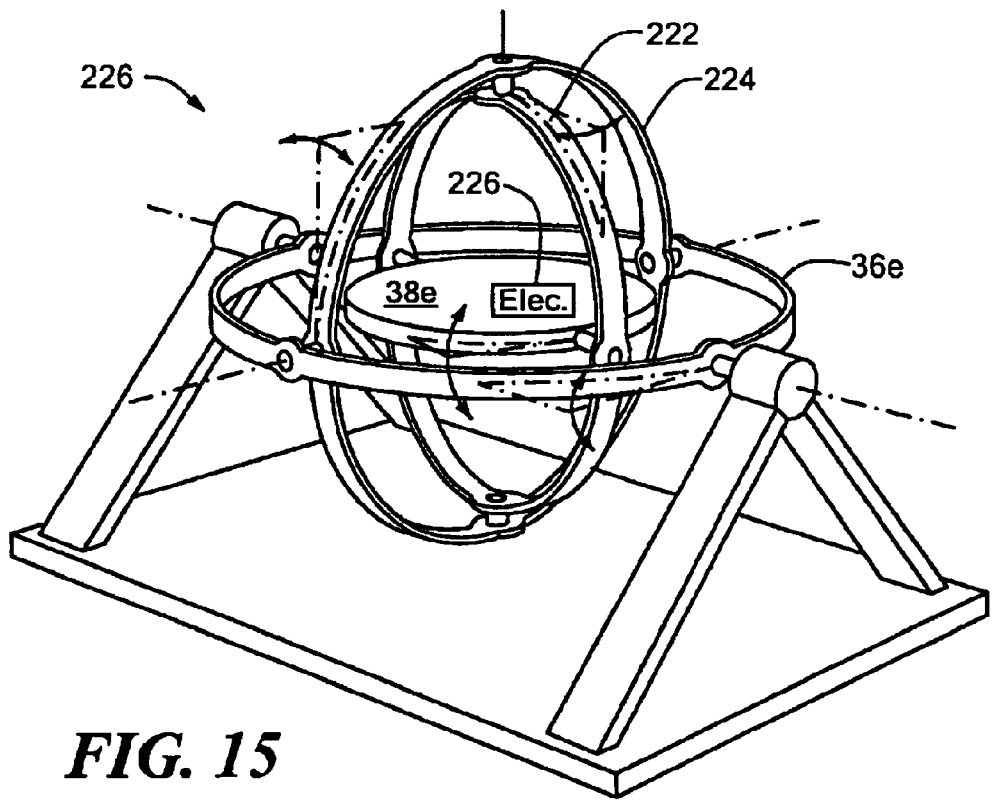
FIG. 15 is a schematic view of an alternate embodiment of a gimbal assembly that includes four gimbals for the compact navigation system shown in FIGS. 12A–12C.

When the navigation system 16b–16d is performing the inertial navigation function during extreme maneuvers of rover 200, 200a, three gimbaled system 210, FIG. 14, or the four or more gimbaled system 220, FIG. 15, is preferred for obtaining the benefits of averaging out the inertial navigation errors due to gyro bias errors and inertial navigation errors due to accelerometer bias errors using carouseling.

Let A(t) be the transformation matrix from the inner gimbal frame to an inertial frame at time t, where A(t) is calculated using the gyro outputs given the initial condition $A(t_o)$ at time $t_o$. Namely, let ω(t) be the inertial angular velocity in the inner gimbal frame, as measured by the gyro angular rate outputs. Numerically integrate the quaternion differential equation dQ(t)/dt=0.5 Q(t) ω(t) with initial condition $Q(t_o)$, where $Q(t_o)$ is determined by $A(t_o)$, and where the four-component quaternion Q(t) quaternion multiplies the three-vector ω(t) augmented with real quaternion part zero. Then A(t) is determined from Q(t) using the standard formulas relating quaternions and rotation matrices.

Let B(t) be the desired transformation matrix from the inner gimbal frame to the inertial frame at time t, where $B(t_o)=A(t_o)$ and B(t) has the inner gimbal frame following the dual carousel motion arising from rotating about one inertial direction and rotating about another direction orthogonal to the first and rotating about the first, where the two carousel rates are integer ratios of each other, such as one two or three times the other. Compute the matrix $\epsilon(t)=B(t)^T A(t)$, where the transpose $B(t)^T$ of B(t) is its inverse, and where $\epsilon(t_o)$ is the identity matrix. For t near $t_o$, $$\varepsilon(t) \approx \begin{bmatrix} 1 & \varepsilon_3 & -\varepsilon_2 \\ -\varepsilon_3 & 1 & \varepsilon_1 \\ \varepsilon_2 & -\varepsilon_1 & 1 \end{bmatrix} \quad (3)$$

where the small error angles $\epsilon_1, \epsilon_2, \epsilon_3$ are taken to be virtual gyro outputs that are nulled by the gimbal control law that commands gimbal torques. With the gimbal control law operative from time $t_o$, the error angles stay small as time progresses, and the inner gimbal platform follows the desired carousel motion relative to inertial space that exactly cancels the inertial navigation errors due to constant gyro bias errors and the inertial navigation errors due to constant accelerometer bias errors over a carousel period. With periodic reversal of full rotation carousel motions, the inertial navigation effects of constant gyro scale factor errors and constant gyro alignment errors average zero over multiple carousel periods. All these effects will almost average zero if there are slow variations (relative to the carousel periods) of gyro and accelerometer bias errors and gyro scale factor and alignment errors.

The commanded gimbal motions in a three-gimbal system to follow the dual carouseling trajectory might pass through a condition of gimbal lock, where a desired finite motion of the inner gimbal platform would require very large gimbal angular motions. There are two preferred approaches to address this problem.

First, the inner gimbal platform trajectory could deviate from the desired trajectory as the three gimbals go through a lock condition. Depending on the maneuvers of rover 200, 200a, this deviation could last only a short time, so the net effect of not exactly averaging out error effects could be small, which would allow a great simplification in being able to accomplish the mission with three rather than four gimbals.

Second, independent of whatever maneuvers undertaken by rover 200, 200a, four gimbals could be employed. With the proper gimbal-lock avoidance control law, such as contained in U.S. Pat. No. 4,052,654, herein incorporated by reference and assigned to Draper Laboratory in Cambridge, Mass., the gimbal motions can be commanded to have the inner gimbal platform follow the desired trajectory without the four gimbals going through gimbal lock.

Calibration When Stationary

At the start of a mission, or periodically during a mission, rover 200, 200a might have a period of being stationary on the Earth or other celestial body, such as Mars or the moon. The navigation system gimbals can then be used to perform calibrations of the gyro and accelerometers biases, scale factors, and input axis misalignments by providing the system with known inputs. Discrete position or continuous tumbles can be done, with the accelerometer and gyro input axes being placed at various angles relative to the local vertical and the Earth or other celestial body rotation vector. The accelerometer scale factors and biases are calibrated versus the modeled gravity field of the Earth or other celestial body, where accelerometer input axis up and down orientations are particularly useful for this purpose because of the insensitivity of accelerometer output to input axis misalignments in these orientations. Continuous rotations about various gimbal axes could be used to calibrate gyro scale factors, for gyro input axes not orthogonal to all gimbals, either multi-revolution rotations for greatest accuracy, or 180° rotations during a gyrocompass operation.

As would be understood by those skilled in the art, the methods for gyrocompassing, gyrocompass data processing, and calibration of gyro scale factors during gyrocompass slews for rover navigation system 16b–16f are similar to the methods described above for borehole navigation system 16, 16a.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A compact navigation system for a rover, the navigation system comprising:
   a housing configured to be transported by the rover;
   a gimbal system having two or more gimbals that includes at least an outer gimbal connected to said housing and an inner gimbal nested in and connected to said outer gimbal;
   a solid state three-axis gyro assembly mounted on said inner gimbal;
   a solid state three-axis accelerometer assembly mounted on said inner gimbal;
   a gyro logic circuit responsive to said three-axis gyro assembly for producing an inertial angular rate about each gyro input axis;
   an accelerometer logic circuit responsive to said three-axis accelerometer assembly for producing a non-gravitational acceleration along each accelerometer input axis; and
   a processor responsive to said gyro logic circuit and said accelerometer logic circuit for determining the attitude and the position of said housing to provide for long term accuracy of the attitude and the position for navigation of the rover.

2. The compact navigation system of claim 1 in which the axis of said outer gimbal extends along the rover and has a substantially vertical orientation.

3. The compact navigation system of claim 1 in which the axis of said inner gimbal is oriented laterally in relation to the outer gimbal axis.

4. The compact navigation system of claim 1 in which said outer gimbal includes a drive motor for rotating said outer gimbal with complete rotary freedom.

5. The compact navigation system of claim 1 in which said inner gimbal includes a drive motor for rotating said inner gimbal.

6. The compact navigation system of claim 1 in which said inner gimbal is rotatable 180° in each direction.

7. The compact navigation system of claim 1 in which said inner gimbal includes a twist capsule device and said outer gimbal includes a slip ring or rotary transformer device for electrically interconnecting said gyro and said accelerometer logic circuits with said processor.

8. The compact navigation system of claim 1 in which at least one of the gimbals includes a gimbal angle readout.

9. The compact navigation system of claim 1 in which said solid state three-axis gyro assembly includes three, one-axis gyros.

10. The compact navigation system of claim 1 in which said solid state three-axis gyro assembly includes a MEMS gyro system.

11. The compact navigation system of claim 1 in which said solid state three-axis gyro assembly includes a laser gyro system.

12. The compact navigation system of claim 1 in which said solid state three-axis gyro assembly includes a quartz gyro system.

13. The compact navigation system of claim 1 in which said solid state three-axis accelerometer assembly includes three, one-axis accelerometers.

14. The compact navigation system of claim 1 in which said solid state three-axis accelerometer assembly includes a MEMS accelerometer system.

15. The compact navigation system of claim 1 in which said solid state three-axis accelerometer assembly includes a quartz accelerometer system.

16. The compact navigation system of claim 1 in which said gyro logic circuit includes a field programmable gate array.

17. The compact navigation system of claim 1 in which said gyro logic circuit includes an application-specific integrated circuit.

18. The compact navigation system of claim 1 in which said accelerometer logic circuit includes a field programmable gate array.

19. The compact navigation system of claim 1 in which said accelerometer logic circuit includes an application-specific integrated circuit.

20. The compact navigation system of claim 1 in which said processor commands rotation of said gimbals to determine north and vertical directions and to calibrate the gyro assembly and the accelerometer assembly biases.

21. The compact navigation system of claim 1 in which said processor commands rotation of said gimbals to determine north and vertical directions and to calibrate the gyro assembly and the accelerometer assembly biases and to calibrate gyro scale factors.

22. The compact navigation system of claim 1 in which said processor commands rotation of said gimbals to a plurality of positions to effect calibration of gyro and accelerometer model parameters.

23. The compact navigation system of claim 1 in which said processor commands carouseling and indexing of said gimbals to average out the inertial navigation errors due to gyro bias errors and inertial navigation errors due to accelerometer bias errors.

24. The compact navigation system of claim 1 in which said processor periodically commands the reversal of the carouseling and indexing of said gimbals to average out inertial navigation errors due to gyro scale factor errors and gyro misalignment errors.

25. The compact navigation system of claim 1 in which said processor also determines the velocity of said housing on the rover.

26. The compact navigation system of claim 1 in which said processor is coupled to an external aid that provides incomplete navigation visibility, the external aid being selected from the group consisting of an altimeter, a depth meter, a velocity indicator, a velocity log, a magnetic compass, a magnetometer, an odometer, terrain, a landmark, a map recognition, and a star sighting.

27. The compact navigation system of claim 1 in combination with a radio navigation system.

28. The compact navigation system and the radio navigation system of claim 27 in which said processor is responsive to information from said radio navigation system and uses the information as an external aid.

29. The compact navigation system and radio navigation system of claim 28 in which said processor uses only the navigation system to navigate when information from the radio navigation system is not available.

30. The compact navigation system of claim 1 in which the rover is a land rover.

31. The compact navigation system of claim 1 in which the rover is a subterranean rover.

32. The compact navigation system of claim 1 in which the rover is a person.

33. A compact navigation system for a rover, the navigation system comprising:
a housing configured to be transported by the rover;
a gimbal system having three or more gimbals that includes at least an outer gimbal connected to said housing and an inner gimbal nested in and connected to one or more middle gimbals that are connected to said outer gimbal;
a solid state three-axis gyro assembly mounted on said inner gimbal;
a solid state three-axis accelerometer assembly mounted on said inner gimbal;
a gyro logic circuit responsive to said three-axis gyro assembly for producing an inertial angular rate about each gyro input axis;
an accelerometer logic circuit responsive to said three-axis accelerometer assembly for producing a non-gravitational acceleration along each accelerometer input axis; and
a processor responsive to said gyro logic circuit and said accelerometer logic circuit for determining the attitude and the position of said housing to provide for long term accuracy of the attitude and the position for navigation of the rover.

34. The compact navigation system of claim 33 in which the axis of said inner gimbal extends laterally in relation to the axis of said outer gimbal when the one or more middle gimbals are at a predetermined reference position.

35. The compact navigation system of claim 33 in which each of the outer gimbal, the one or more middle gimbals, and the inner gimbal includes a drive motor for rotating the associated gimbal with complete rotary freedom.

36. The compact navigation system of claim 33 in which each of the outer gimbal, the one or more middle gimbals, and the inner gimbal includes a twist capsule device, a slip ring device, or a rotary transformer device for electrically interconnecting said gyro and said accelerometer logic circuits with said processor.

37. The compact navigation system of claim 33 in which the outer gimbal, the one or more middle gimbals, and the inner gimbal are equipped with gimbal angle readouts.

38. The compact navigation system of claim 33 in which said solid state three-axis gyro assembly includes three, one-axis gyros.

39. The compact navigation system of claim 33 in which said solid state three-axis gyro assembly includes a MEMS gyro system.

40. The compact navigation system of claim 33 in which said solid state three-axis gyro assembly includes a laser gyro system.

41. The compact navigation system of claim 33 in which said solid state three-axis gyro assembly includes a quartz gyro system.

42. The compact navigation system of claim 33 in which said solid state three-axis accelerometer assembly includes three, one-axis accelerometers.

43. The compact navigation system of claim 33 in which said solid state three-axis accelerometer assembly includes a MEMS accelerometer system.

44. The compact navigation system of claim 33 in which said solid state three-axis accelerometer assembly includes a quartz accelerometer system.

45. The compact navigation system of claim 33 in which said gyro logic circuit includes a field programmable gate array.

46. The compact navigation system of claim 33 in which said gyro logic circuit includes an application-specific integrated circuit.

47. The compact navigation system of claim 33 in which said accelerometer logic circuit includes a field programmable gate array.

48. The compact navigation system of claim 33 in which said accelerometer logic circuit includes an application-specific integrated circuit.

49. The compact navigation system of claim 33 in which said processor commands rotation of said gimbals to determine the north direction and the vertical direction and to calibrate the gyro assembly and the accelerometer assembly biases.

50. The compact navigation system of claim 33 in which said processor commands rotation of said gimbals to determine the north direction and the vertical direction and to calibrate the gyro assembly and the accelerometer assembly biases and to calibrate gyro scale factors.

51. The compact navigation system of claim 33 in which said processor commands rotation of said gimbals to a plurality of positions to effect calibration of gyro and accelerometer model parameters.

52. The compact navigation system of claim 33 in which said processor commands carouseling or indexing of said gimbals to average out the inertial navigation errors due to gyro bias errors and inertial navigation errors due to accelerometer bias errors.

53. The compact navigation system of claim 33 in which said processor periodically commands the reversal of the carouseling or indexing of said gimbals to average out the inertial navigation errors due to gyro scale factor errors and gyro misalignment errors.

54. The compact navigation system of claim 33 in which said processor is coupled to an external aid that provides incomplete navigation visibility, the external aid being selected from the group consisting of an altimeter, a depth meter, a velocity indicator, a velocity log, a magnetic compass, a magnetometer, an odometer, terrain, a landmark, a map recognition, and a star sighting.

55. The compact navigation system of claim 33 in combination with a radio navigation system.

56. The compact navigation system and the radio navigation system of claim 55 in which said processor is responsive to information from said radio navigation system and uses the information as an external aid.

57. The compact navigation system and radio navigation system of claim 56 in which said processor uses only the navigation system to navigate when information from the radio navigation system is not available.

58. The compact navigation system of claim 33 in which said processor also determines the velocity of said housing.

59. The compact navigation system of claim 33 in which the rover is a land rover.

60. The compact navigation system of claim 33 in which the rover is a subterranean rover.

61. The compact navigation system of claim 33 in which the rover is a person.

62. A method for navigating a rover on the Earth or other celestial body, the method comprising the steps of:
providing a housing configured to attach to the rover, the housing including a gimbal system having two or more gimbals that includes at least an outer gimbal connected to said housing, zero or one or more middle gimbals and an inner gimbal nested in and coupled one to the other and to said outer gimbal, said gimbal system including a solid state three-axis gyro assembly and a solid state three-axis accelerometer assembly mounted within said gimbal system;
obtaining information about a position of a first point in a trajectory of the rover;
if the rover is not initially stationary at the first point, obtaining information about the velocity and the attitude;
if the rover is stationary at the first point, determining the velocity due to rotation of the Earth or other celestial body from the position and determining the attitude of the first point in the trajectory of the rover using said three-axis gyro assembly and said three-axis accelerometer assembly by rotating said gimbal system through four or more gyrocompass positions;
traversing through the trajectory to a second point in the trajectory while inertially navigating and carouseling or indexing the gimbals;
if the rover is stationary at the second point, determining the attitude at the second point in the trajectory using said three-axis gyro assembly and said three-axis accelerometer assembly by rotating said gimbal system through four or more gyrocompass positions to obtain attitude results; and
updating navigation of the rover with the attitude results.

63. The method for navigating of claim 62, further including the step of calibrating gyro scale factors from the slews between gyrocompass positions.

64. The method for navigating of claim 62, further including the step of calibrating gyro and accelerometer system parameters from a plurality of gimbal positions when the rover is stationary on the Earth or other celestial body.

65. The method for navigating of claim 62, further including the step of updating the navigation with information from an external aid selected from the group of an altimeter, a depth meter, a velocity indicator, a velocity log, a magnetic compass, a magnetometer, an odometer, terrain, a landmark, a map recognition, a star sighting, a GPS and radio navigation information.

66. The method of navigating of claim 62 in which carouseling or indexing the gimbals is for averaging out inertial navigation errors due to gyro bias errors and inertial navigation errors due to accelerometer bias errors.

67. The method of navigating of claim 62, in which rotating said gimbal system through four or more gyrocompass positions is for determining gyro biases, accelerometer biases, and the components of the gravity vector and the rotation vector of the Earth or other celestial body.

68. The method of navigating of claim 62, further including the step of updating estimates of the level, azimuth, gyro bias, accelerometer bias and scale factor when the velocity of the rover is substantially zero.

69. The method of navigating of claim 68, further including the step of rotating the gimbals to discrete positions including up and down on each accelerometer, and 90 or 180 degrees about the level for determining the gyro bias and an error of the azimuth.

70. The method of navigating of claim 69, wherein the step of updating the estimates includes using a Kalman filter.

* * * * *